US011703061B2

(12) United States Patent
Broughman et al.

(10) Patent No.: US 11,703,061 B2
(45) Date of Patent: Jul. 18, 2023

(54) SYSTEMS AND METHODS FOR MOUNTING ELECTRICALLY POWERED DEVICES TO CEILINGS AND OTHER STRUCTURES

(71) Applicant: Lowe's Companies, Inc., Mooresville, NC (US)

(72) Inventors: James Michael Broughman, Cornelius, NC (US); Dana Lynn Jodice, Charlotte, NC (US); Jason Lu, Mongkok (CN)

(73) Assignee: Lowe's Companies, Inc., Mooresville, NC (US)

( * ) Notice: Subject to any disclaimer, the term of this patent is extended or adjusted under 35 U.S.C. 154(b) by 86 days.

(21) Appl. No.: 17/145,065

(22) Filed: Jan. 8, 2021

(65) Prior Publication Data

US 2021/0207610 A1   Jul. 8, 2021

Related U.S. Application Data

(63) Continuation of application No. 14/497,554, filed on Sep. 26, 2014, now Pat. No. 10,890,191.

(60) Provisional application No. 61/883,696, filed on Sep. 27, 2013.

(51) Int. Cl.
*F04D 25/08* (2006.01)
*F04D 29/60* (2006.01)
*F16M 13/02* (2006.01)
*F21V 21/03* (2006.01)

(52) U.S. Cl.
CPC ......... *F04D 25/088* (2013.01); *F04D 29/601* (2013.01); *F16M 13/027* (2013.01); *F21V 21/03* (2013.01)

(58) Field of Classification Search
CPC .... F04D 25/088; F04D 29/601; F04D 29/246; H02G 3/20; F21V 21/03; F21V 23/06; F21V 27/00; F16M 13/027; F21S 8/04; F21S 8/06; H01R 13/72
See application file for complete search history.

(56) References Cited

U.S. PATENT DOCUMENTS

| 4,721,480 A | 1/1988 | Yung et al. |
| 4,729,725 A * | 3/1988 | Markwardt ........... F04D 25/088 416/246 |
| 4,808,071 A * | 2/1989 | Chau ..................... F04D 25/088 416/170 R |

(Continued)

FOREIGN PATENT DOCUMENTS

| CA | 2477051 | 2/2005 |
| CA | 2549235 | 12/2006 |

(Continued)

OTHER PUBLICATIONS

Application No. CN202010978820.3, Office Action, dated May 6, 2021, 15 pages.

(Continued)

*Primary Examiner* — Kenneth J Hansen
(74) *Attorney, Agent, or Firm* — Kilpatrick Townsend & Stockton LLP

(57) ABSTRACT

Embodiments of the present invention provide systems and methods for mounting an electrically-powered device to a ceiling or other supporting structure. The electrically-powered device can be, for example, a ceiling fan, a ceiling fan with a lighting fixture, or a lighting fixture.

15 Claims, 29 Drawing Sheets

(56) References Cited

U.S. PATENT DOCUMENTS

| | | |
|---|---|---|
| 5,069,601 A | 12/1991 | Shawcross et al. |
| 5,282,757 A | 2/1994 | Maeda |
| 5,462,412 A | 10/1995 | Scofield et al. |
| 5,738,496 A | 4/1998 | Mehta |
| 6,027,310 A | 2/2000 | Winn et al. |
| 6,036,154 A | 3/2000 | Pearce et al. |
| 6,146,191 A | 11/2000 | Winn et al. |
| 6,176,736 B1 | 1/2001 | Hsu et al. |
| 6,305,974 B1 | 10/2001 | Tseng |
| 6,322,232 B1 * | 11/2001 | Oliver ................. F21S 8/04 362/147 |
| 6,325,654 B1 | 12/2001 | Kerr, Jr. et al. |
| 6,464,524 B1 | 10/2002 | Kerr, Jr. et al. |
| 6,503,099 B2 | 1/2003 | Kerr et al. |
| 6,634,901 B2 | 10/2003 | Kerr et al. |
| 6,676,442 B2 | 1/2004 | Kerr et al. |
| 6,761,540 B2 | 7/2004 | Tseng |
| 6,780,049 B1 | 8/2004 | D'Angelo et al. |
| 6,799,982 B2 | 10/2004 | Kerr, Jr. et al. |
| 6,923,677 B2 | 8/2005 | Hsu et al. |
| 6,929,387 B2 | 8/2005 | Hsu et al. |
| 6,939,179 B1 | 9/2005 | Kieffer, Jr. et al. |
| 6,997,740 B2 | 2/2006 | Kerr et al. |
| 7,104,513 B2 | 9/2006 | Blateri et al. |
| 7,160,148 B2 | 1/2007 | Kerr et al. |
| 7,175,441 B2 | 2/2007 | Naviaux et al. |
| 7,192,303 B2 | 3/2007 | Kohen et al. |
| 7,232,336 B1 | 6/2007 | Evans et al. |
| 7,297,022 B2 | 11/2007 | Pearce et al. |
| 7,462,066 B2 | 12/2008 | Kohen et al. |
| 8,033,787 B1 | 10/2011 | Miller et al. |
| 8,215,920 B2 | 7/2012 | Criner et al. |
| 8,336,844 B2 | 12/2012 | Pearce et al. |
| 8,353,675 B2 | 1/2013 | Lin et al. |
| 8,460,016 B2 | 6/2013 | Liu et al. |
| 10,890,191 B2 | 1/2021 | Broughman et al. |
| 2002/0111063 A1 | 8/2002 | Kerr |
| 2003/0193810 A1 * | 10/2003 | Patz ................. F21S 8/06 362/407 |
| 2008/0181783 A1 | 7/2008 | Pearce et al. |
| 2009/0280673 A1 | 11/2009 | Kohen et al. |
| 2012/0305743 A1 | 12/2012 | Kerr, Jr. et al. |
| 2013/0292149 A1 | 11/2013 | Cooper et al. |
| 2015/0090858 A1 | 4/2015 | Broughman et al. |

FOREIGN PATENT DOCUMENTS

| | | |
|---|---|---|
| CN | 2477051 | 2/2002 |
| CN | 2549235 | 5/2003 |
| CN | 1616834 | 5/2005 |
| CN | 1644931 | 7/2005 |
| CN | 1880779 | 12/2006 |
| CN | 104728182 | 6/2015 |
| JP | H04212276 | 8/1992 |

OTHER PUBLICATIONS

U.S. Appl. No. 14/497,554, Final Office Action, dated Nov. 8, 2018, 21 pages.
U.S. Appl. No. 14/497,554, Final Office Action, dated Oct. 25, 2017, 22 pages.
U.S. Appl. No. 14/497,554, Non-Final Office Action, dated Mar. 21, 2017, 16 pages.
U.S. Appl. No. 14/497,554, Non-Final Office Action, dated Apr. 10, 2018, 17 pages.
U.S. Appl. No. 14/497,554, Notice of Allowance, dated Sep. 10, 2020, 8 pages.
U.S. Appl. No. 14/497,554, "Restriction Requirement", dated Oct. 7, 2016, 7 pages.
Application No. CA2,865,478, Notice of Allowance, dated Jul. 9, 2019, 1 page.
Application No. CA2,865,478, Office Action, dated Nov. 3, 2017.
Application No. CA2,865,478, Office Action, dated Feb. 26, 2016, 3 pages.
Application No. CA2,865,478, Office Action, dated Jan. 10, 2017, 3 pages.
Application No. CA2,865,478, Office Action, dated Aug. 23, 2018, 5 pages.
Application No. CA2,979,762, Notice of Allowance, dated Jul. 2, 2019, 1 page.
Application No. CA2,979,762, Office Action, dated Aug. 6, 2018, 4 pages.
Application No. CN201410755874.8, Office Action, dated Dec. 5, 2017, 10 pages.
Application No. CN201410755874.8, Office Action, dated Oct. 18, 2019, 16 pages.
Application No. CN201410755874.8, Office Action, dated Oct. 24, 2016, 16 pages.
Application No. CN201410755874.8, Office Action, dated Jun. 20, 2017, 18 pages.
Application No. CN201410755874.8, Office Action, dated Feb. 26, 2020, 6 pages.
Application No. CN201410755874.8, Office Action, dated Dec. 5, 2018, 7 pages.
Application No. CN201410755874-8, Office Action, dated Jun. 6, 2018, 7 pages.
Application No. CN202010978820.3, Office Action, dated Sep. 18, 2021, 14 pages.

\* cited by examiner

SYSTEMS AND METHODS FOR MOUNTING ELECTRICALLY POWERED DEVICES TO CEILINGS AND OTHER STRUCTURES

CROSS-REFERENCES TO RELATED APPLICATIONS

This application is a continuation of U.S. patent application Ser. No. 14/497,554, filed Sep. 26, 2014, which application claims the benefit of U.S. Provisional Patent Application No. 61/883,696, filed Sep. 27, 2013, the entire contents of which are hereby incorporated by reference in their entirety for all purposes.

FIELD OF THE INVENTION

Embodiments of the present invention relate generally to systems and methods for mounting electrically powered devices, such as ceiling fans, to ceilings and other structures.

BACKGROUND

Ceiling fans are popular home fixtures as they provide a number of benefits. For example, ceiling fans circulate air, assist with cooling, contribute to the appearance or look of a room, and/or can provide additional lighting. Despite these benefits, ceiling fans can be difficult to install.

Conventionally, a mounting bracket is first mechanically secured to the ceiling or electrical junction box. The assembled ceiling fan is then electrically connected to the electrical junction box. Wires in the electrical junction box are typically already connected to a source of alternating-current electric power (e.g., house power), although the power supply should be turned off during installation of the ceiling fan. The assembled ceiling fan has a plurality of wires extending from the fan motor (and light, if provided) to power the fan motor (and light) when connected to the power source. For example, in fan assemblies with a light, the fan assembly typically has four wires: a hot wire for the fan, a hot wire for the light, a neutral wire, and a grounding wire. In ceiling fan assemblies that utilize down-rods, the wires from the fan assembly will extend through the down-rod. The wires from the ceiling fan assembly must be connected to the wires in the electrical junction box. Wire nuts are typically used to connect corresponding wires. Because the fan assembly wires are connected to the fan assembly, the entire fan assembly (or at least the fan motor and light) often must be held or supported while the fan assembly wires are connected to the wires in the electrical junction box. In some situations, two people are required for this step—one person holds the fan assembly while the other connects the wires. After the wires are connected, a structure at a top end of the fan assembly can be positioned in a corresponding structure in the mounting bracket to support the fan assembly during use. In other situations, the structure at a top end of the fan assembly can be positioned in the corresponding structure in the mounting bracket to support the fan assembly prior to connecting the wires (and during use). The connected wires are then tucked into the electrical junction box and a canopy is mechanically secured to the mounting bracket. If not already installed, the fan blades are then connected to corresponding irons on the fan assembly. If the fan assembly included a light kit with a removable light cover, the light cover is then secured to the fan assembly.

In general, it would be advantageous to have improved systems and methods for mounting ceiling fans to ceilings and other structures. The connection of the wires in the fan assembly to the wires in the electrical junction box is perhaps the most challenging aspect of ceiling fan installation, and it would be particularly advantageous to improve this aspect of ceiling fan installation. Thus, some embodiments of the invention described herein seek to provide systems and methods for mounting ceiling fans that provide a number of advantages over existing systems and methods.

BRIEF SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Various embodiments of the present invention relate to systems for mounting an electrically-powered device to a ceiling or other supporting structure, to systems for mounting a ceiling fan, to methods for mounting an electrically-powered device, and to methods for mounting a ceiling fan. In addition to ceiling fans, other examples of electrically-powered devices that can be mounted using systems and methods of the present invention include lighting fixtures. While ceiling fans are often mounted to ceilings, it should be understood that some embodiments of the present invention can be adapted for mounting to other supporting structures including, for example, an exposed beam, a drop ceiling, and others. Likewise, when mounted to a ceiling or other supporting structure, the ceiling or other supporting structure does not necessarily need to be parallel to the floor (e.g., the ceiling can be a slanted ceiling, a cathedral ceiling, a vaulted ceiling, etc.).

Certain embodiments of the invention provide a system for mounting an electrically-powered device to a ceiling or other supporting structure that comprises: a mounting bracket comprising a receiving portion and a first electrical connector; and a hangable structure comprising a mating member configured to be positioned against the receiving portion, the hangable structure further comprising a second electrical connector, wherein the second electrical connector is configured to vertically engage the first electrical connector when the mating member is positioned so as to rest in a proper alignment against the receiving portion, and wherein the mounting bracket and the hangable structure are configured so that, when the mating member is positioned against the receiving portion in the proper alignment, the effect of gravity on the hangable structure tends to keep the hangable structure engaged to the mounting bracket.

In another embodiment, a system for mounting an electrically-powered device to a ceiling or other supporting structure comprises: a mounting bracket comprising a receiving portion and a first electrical connector; and a hangable structure comprising a mating member configured to be positioned against the receiving portion, the hangable structure further comprising a second electrical connector, wherein the second electrical connector is configured to engage the first electrical connector when the hangable structure is moved downwardly into position so as to rest in a proper alignment against the receiving portion.

In some embodiments, a system for mounting a ceiling fan comprising a motor for rotating a plurality of fan blades comprises: a mounting bracket comprising a support surface having an opening; a first electrical connector coupled to the mounting bracket; a hangable structure coupled to the ceiling fan and comprising a second electrical connector and a plurality of wires extending from the second electrical connector to the motor, the hangable structure comprising a mating member and a down-rod, wherein the plurality of wires extend from the second electrical connector through the down-rod to the motor, and wherein the mating member is adapted to rest against the support surface and wherein the second electrical connector vertically engages the first electrical connector when the mating member rests against the support surface in a proper alignment.

A method for mounting a ceiling fan, wherein the ceiling fan comprises a motor for rotating a plurality of fan blades, comprises, in some implementations: providing a mounting bracket comprising a support surface having an opening; providing a first electrical connector coupled to the mounting bracket; providing a hangable structure coupled to the ceiling fan and comprising a second electrical connector and a plurality of wires extending from the second electrical connector to the motor, the hangable structure further comprising a mating member and a down-rod, wherein the plurality of wires extend from the second electrical connector through the down-rod to the motor; sliding the down-rod through the opening in the support surface; placing the mating member against the support surface; and vertically engaging the second electrical connector with the first electrical connector.

These and other embodiments are presented in greater detail in the Detailed Description which follows.

DETAILED DESCRIPTION

Figure 1:
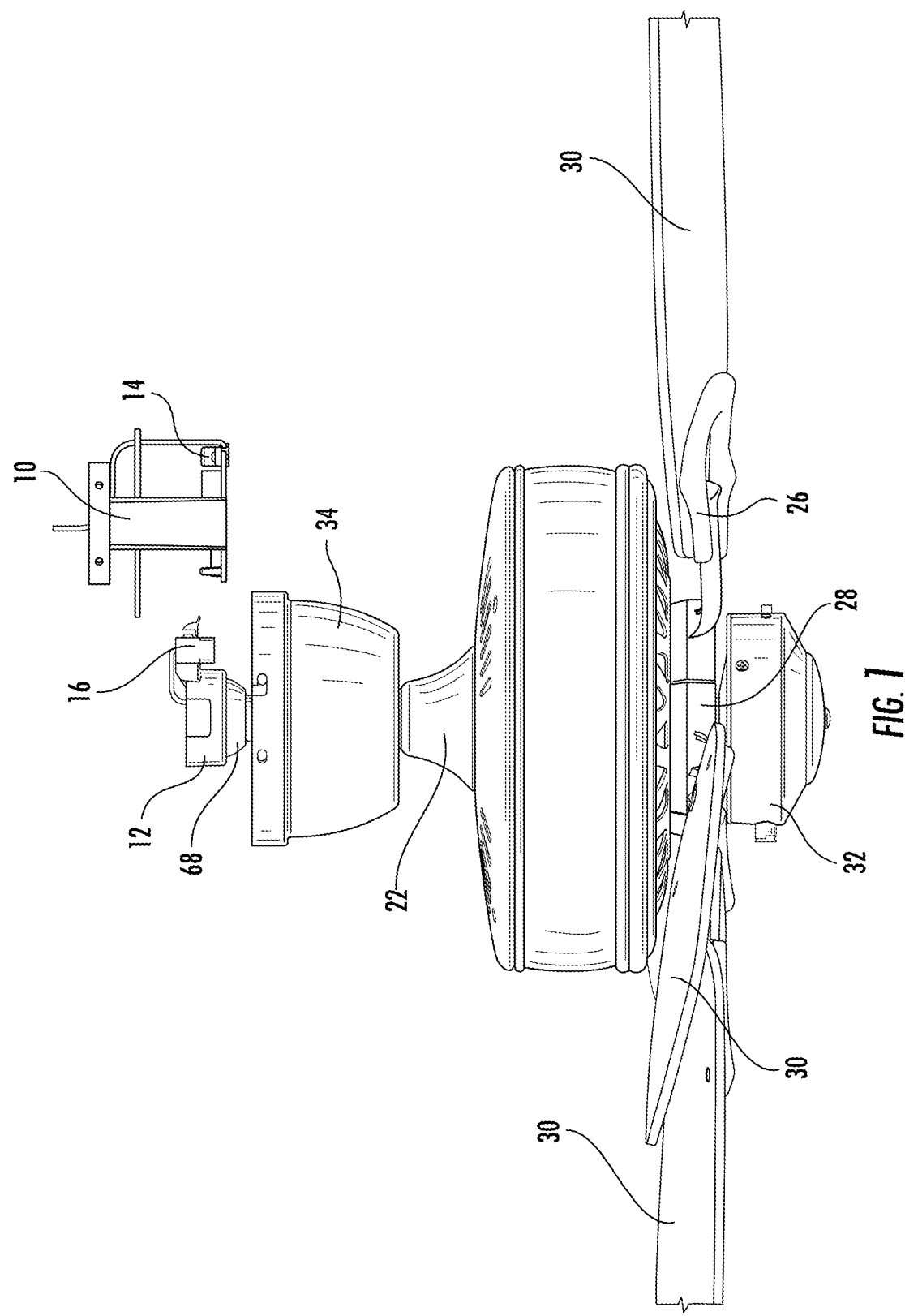
FIG. 1 shows a side view of components of a system for mounting a ceiling fan to a supporting structure according to one embodiment of the present invention.
Figure 2:
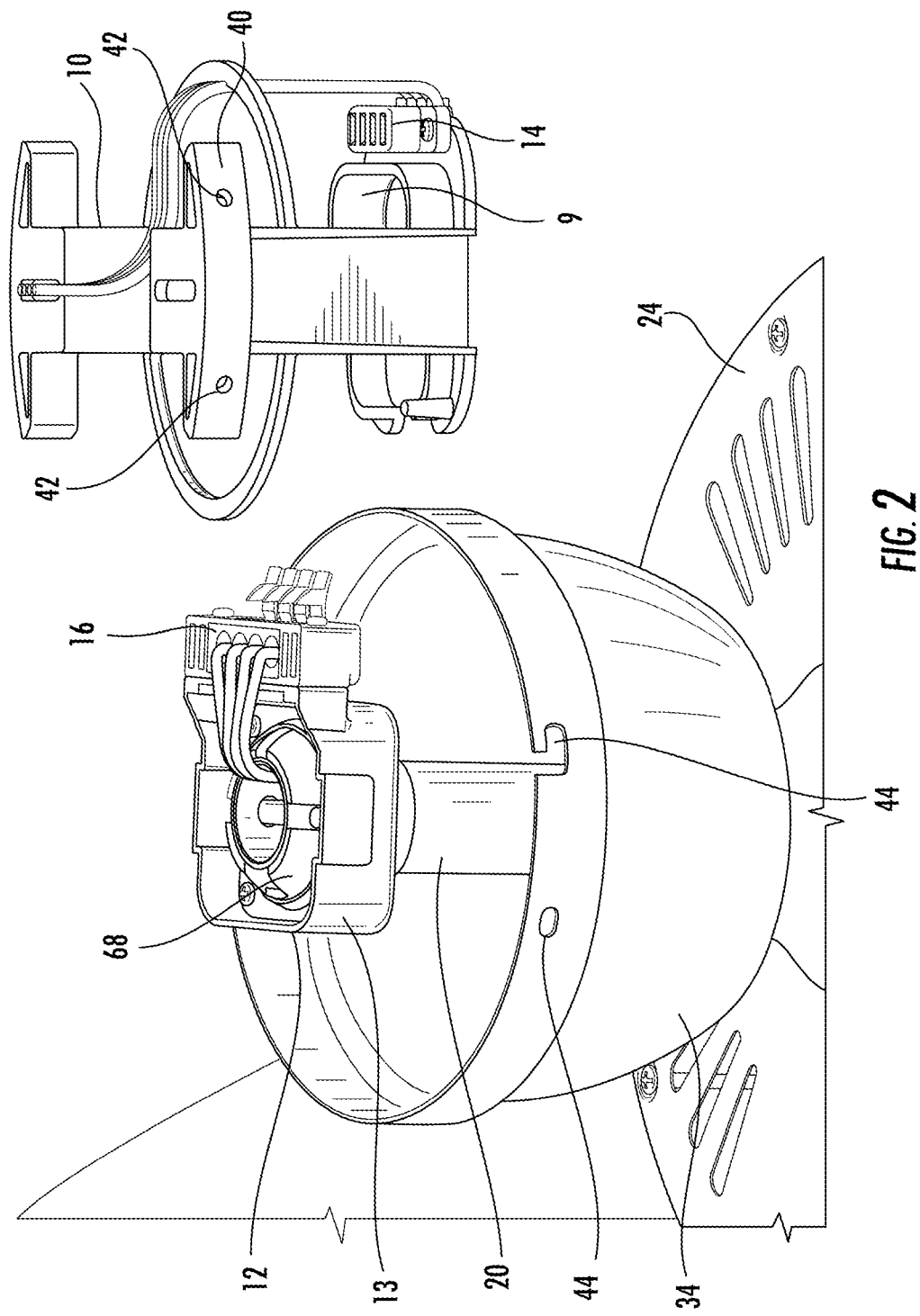
FIG. 2 shows a side perspective view of components of a system for mounting a ceiling fan to a supporting structure according to one embodiment of the present invention.

The subject matter of embodiments of the present invention is described here with specificity to meet statutory requirements, but this description is not necessarily intended to limit the scope of future claims. The subject matter to be claimed may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention relate to systems and methods for mounting an electrically-powered device to a ceiling or other supporting structure. While the systems and methods described herein are primarily useful in mounting ceiling fans to a ceiling, it should be understood that some embodiments of such systems and methods can be used to mount other electrically-powered devices such as lighting fixtures (e.g., chandeliers). Likewise, while ceiling fans are often mounted to ceilings, it should be understood that some embodiments of the present invention can be adapted for mounting to other supporting structures including, for example, an exposed beam, a drop ceiling, and others. Likewise, when mounted to a ceiling or other supporting structure, the ceiling or other supporting structure does not necessarily need to be parallel to the floor (e.g., the ceiling can be a slanted ceiling, a cathedral ceiling, a vaulted ceiling, etc.).

In some embodiments, ceiling fans that are to be mounted can include a light kit or light. While the description and figures of particular embodiments may or may not specifically reference a light kit or light being coupled to the fan assembly, it should be understood that the illustrated embodiments can easily be adapted for fan assemblies with lights, or that illustrated embodiments showing fan assemblies with a light kit or light can easily be adapted for fan assemblies without lights. Similarly, systems and methods of the present invention can readily be adapted for the mounting of flush-mount fan assemblies, fan assemblies with down-rods, or others.

Some embodiments of the present invention relate to systems for mounting an electrically-powered device to a ceiling or other supporting structure. Certain embodiments of the invention provide a system for mounting an electrically-powered device to a ceiling or other supporting structure that comprises: a mounting bracket comprising a receiving portion and a first electrical connector; and a hangable structure comprising a mating member configured to be positioned against the receiving portion, the hangable structure further comprising a second electrical connector, wherein the second electrical connector is configured to vertically engage the first electrical connector when the mating member is positioned so as to rest in a proper alignment against the receiving portion, and wherein the mounting bracket and the hangable structure are configured so that, when the mating member is positioned against the receiving portion in the proper alignment, the effect of gravity on the hangable structure tends to keep the hangable structure engaged to the mounting bracket.

In another embodiment, a system for mounting an electrically-powered device to a ceiling or other supporting structure comprises: a mounting bracket comprising a receiving portion and a first electrical connector; and a hangable structure comprising a mating member configured to be positioned against the receiving portion, the hangable structure further comprising a second electrical connector, wherein the second electrical connector is configured to engage the first electrical connector when the hangable structure is moved downwardly into position so as to rest in a proper alignment against the receiving portion.

In some embodiments, the mounting bracket and the hangable structure are configured so that, when the mating member is positioned against the receiving portion in the proper alignment, the effect of gravity on the hangable structure tends to keep the first and second electrical connectors in electrical contact. The mating member, in some embodiments can have a shape that substantially matches the shape of a surface of the receiving portion so that, after the mating member is positioned against the receiving portion in the proper alignment, the mating member tends to stay in the proper alignment as the hangable structure hangs from the mounting bracket.

The first electrical connector and second electrical connector, in various embodiments, can comprise male connectors with corresponding female connectors, electrical contact spring pins with corresponding electrical contact surfaces, and other types of electrical connectors. In some embodiments, the first electrical connector is adapted to be electrically connected to a source of alternating-current electric power, and the second electrical connector can be coupled electrically to a fan motor or other electrically-powered device. The hangable structure, in some embodiments, further comprises a down-rod, and a plurality of wires extend from the second electrical connector through the down-rod to the fan motor or other electrically-powered device. In some embodiments, the second electrical connector is further coupled electrically to a light.

The second electrical connector, in some embodiments, is electrically coupled to a plurality of wires which are wrappable around at least a portion of the mounting bracket before the second electrical connector is vertically engaged with the first electrical connector. In some embodiments, the mounting bracket comprises at least one hook to facilitate wrapping and retention of the plurality of wires around at least one portion of the mounting bracket.

The mounting bracket, in some embodiments, comprises a prong, and the hangable structure comprises a groove, such that the groove is adapted to slide over the prong, and the groove and prong facilitate alignment of the hangable structure with the mounting bracket. In other embodiments, the groove can be on the mounting bracket, and the prong can be on the hangable structure.

In some embodiments, the mating member is wider than a lower portion of the hangable structure and the receiving portion includes an opening of sufficient size to allow the lower portion to pass through the opening and into the receiving portion while the mating member passes above the opening. In some such embodiments, the receiving portion is configured so that, after the lower portion is brought into the receiving portion, the hangable structure can be lowered so that the mating member is positioned against the receiving portion in the proper alignment and interferes with gravity-influenced passage of the mating member entirely through the receiving portion.

The receiving portion, in some embodiments, comprises a support surface, and the mating member is adapted for positioning against at least a portion of the support surface. The receiving portion further comprises at least one slot formed by two ridges on a sidewall of the mounting bracket in some embodiments. For example, the mating member can comprise a protrusion configured to slide into the at least one slot. In some such embodiments, the mating member comprises a protrusion configured to slide into the at least one slot.

In some embodiments, a system for mounting a ceiling fan comprising a motor for rotating a plurality of fan blades comprises: a mounting bracket comprising a support surface having an opening; a first electrical connector coupled to the mounting bracket; a hangable structure coupled to the ceiling fan and comprising a second electrical connector and a plurality of wires extending from the second electrical connector to the motor, the hangable structure comprising a mating member and a down-rod, wherein the plurality of wires extend from the second electrical connector through the down-rod to the motor, and wherein the mating member is adapted to rest against the support surface and wherein the second electrical connector vertically engages the first electrical connector when the mating member rests against the support surface in a proper alignment.

In some embodiments, the second electrical connector vertically engages the first electrical connector when the mating member is positioned against the support surface.

The first electrical connector and second electrical connector, in various embodiments, can comprise male connectors with corresponding female connectors, electrical contact spring pins with corresponding electrical contact surfaces, and other types of electrical connectors.

The mounting bracket and the hangable structure are configured, in some embodiments, so that, when the mating member is positioned against the support surface in the proper alignment, the effect of gravity on the hangable structure tends to keep the first and second electrical connectors in electrical contact.

In some embodiments, the mating member has a shape that substantially matches the shape of the support surface so that, after the mating member is positioned against the support surface in the proper alignment, the mating member tends to stay in the proper alignment as the hangable structure hangs from the mounting bracket. The mating member, in some embodiments, is wider than the down-rod, and the opening of the support surface is sufficient in size to allow the down-rod to pass through the opening and into a space substantially surrounded by the support surface while the mating member passes above the opening. In some such embodiments, the support surface is configured so that, after the down-rod is brought into the space, the hangable structure can be lowered so that the mating member is positioned against the support surface in the proper alignment and interferes with gravity-influenced passage of the mating member entirely through the support surface.

The plurality of wires, in some embodiments, are wrappable around at least a portion of the mounting bracket before the second electrical connector is vertically engaged with the first electrical connector. In some embodiments, the mounting bracket comprises at least one hook to facilitate wrapping and retention of the plurality of wires around at least one portion of the mounting bracket.

The mounting bracket, in some embodiments, comprises a prong, and the hangable structure comprises a groove, such that the groove is adapted to slide over the prong, and the groove and prong facilitate alignment of the hangable structure with the mounting bracket. In other embodiments, the groove can be on the mounting bracket, and the prong can be on the hangable structure.

In some embodiments, the width of the opening is greater than the diameter of the down-rod. The mounting bracket, in some embodiments, comprises at least one slot formed by the support surface and two ridges on a sidewall of the mounting bracket. In some such embodiments, the hangable structure comprises a protrusion configured to slide into the at least one slot.

A method for mounting a ceiling fan, wherein the ceiling fan comprises a motor for rotating a plurality of fan blades, comprises, in some implementations: providing a mounting bracket comprising a support surface having an opening; providing a first electrical connector coupled to the mounting bracket; providing a hangable structure coupled to the ceiling fan and comprising a second electrical connector and a plurality of wires extending from the second electrical connector to the motor, the hangable structure further comprising a mating member and a down-rod, wherein the plurality of wires extend from the second electrical connector through the down-rod to the motor; sliding the down-rod through the opening in the support surface; placing the mating member against the support surface; and vertically engaging the second electrical connector with the first electrical connector. The second electrical connector, in some embodiments, is vertically engaged with the first electrical connector substantially simultaneously with placement of the mating member against the support surface. In some embodiments, such methods further comprise connecting the first electrical connector to a source of alternating-current electric power. Some methods, in some embodiments, further comprise wrapping a portion of the plurality of wires around a portion of the mounting bracket.

Certain aspects of the present invention will now be discussed in connection with the attached Figures which illustrate some embodiments of the present invention. Although the remainder of the description associated with the Figures will focus on embodiments related to the mounting of ceiling fans with down-rods, it should be understood that only slight modifications need to be made to the components in order to create systems for the mounting of flush-mount ceiling fans as well as other electrically-powered devices (e.g., hanging lights such as chandeliers).

FIGS. 1-19 illustrate various components of a system 5 for mounting a ceiling fan to a supporting structure according to one embodiment of the present invention. While various components are illustrated and described in connection with FIGS. 1-19, it should be understood that not all systems according to the present invention may utilize each of the components and features illustrated and described. FIG. 1 is a side view of the system 5. The system 5 includes a mounting bracket 10 and a hangable structure 12 configured such that the hangable structure 12 can be positioned so as to hang from the mounting bracket 10 as described further herein. To facilitate this positioning, in some embodiments, the mounting bracket 10 comprises a receiving portion 9 and the hangable structure 12 comprises a mating member 13, with the mating member 13 being configured to be positioned against the receiving portion 9. The mounting bracket 10 includes a first electrical connector 14, and the hangable structure 12 comprises a second electrical connector 16. The first and second electrical connectors 14,16 are oriented such that they vertically engage (making an electrical connection) when the mating member 13 is properly positioned on the mounting bracket 10 (e.g., a receiving portion 9 of the mounting bracket 10) as discussed further herein.

The hangable structure 12 further comprises a ball or ball-like structure 68 that is positioned in the mating member 13 and is coupled to a down-rod 20 (best seen in other Figures). The down-rod 20 is coupled to a yoke (not visible due to a yoke cover 22). The down-rod 20 can be coupled to the yoke using techniques known to those of skill in the art such as by passing a pin through aligned holes in the down-rod 20 and yoke and then securing the pin with a Cotter pin. Set screws can also be used to further secure the down-rod 20 to the yoke. The yoke is typically coupled to the ceiling fan motor or motor housing 24 using screws or other fasteners. The ceiling fan motor (not shown) is typically located in a motor housing 24. A plurality of blade irons 26 are each coupled at one end to a hub 28 or similar item that is coupled to the motor. The plurality of blade irons 26 are also coupled to a plurality of fan blades 30. A switch housing 32 is coupled to the structure beneath the motor housing. In some embodiments, a light kit may be connected to the ceiling fan assembly at the switch housing 32. The embodiment shown also includes a canopy 34 that when installed, is generally adjacent to the ceiling or other supporting structure and can hide the mounting bracket 10, mating member 13, and associated electrical connection. In FIG. 1, the canopy 34 is not in its installed position in order to facilitate positioning of the mating member 13 on the mounting bracket 10 and connecting of the electrical connectors 14,16. The canopy 34 is shown in its installed position in FIG. 16; a ceiling is not shown in FIG. 16, but it should be understood that the top edge of the canopy 34 would typically be flush with the ceiling (or other supporting structure).

The mounting aspects of various embodiments of systems and methods of the present invention are the result of interactions between a mounting bracket, a mating member (and/or other components of a hangable structure), and electrical connectors. This mounting assembly can readily be adapted for the mounting of ceiling fans other than the ones shown in the attached Figures (e.g., fans without a down-rod, fans with different numbers of fan blades, fans with light kits, etc.), to lighting fixtures, and to other electrically-powered devices that are to be mounted to a ceiling or other supporting structure. As such, persons of skill in the art can select a wide variety of fan, lighting, or other device components to use with embodiments of mounting assemblies of the present invention based on a variety of factors including, for example, ornamental appearance, function, cost, etc.

Figure 3:
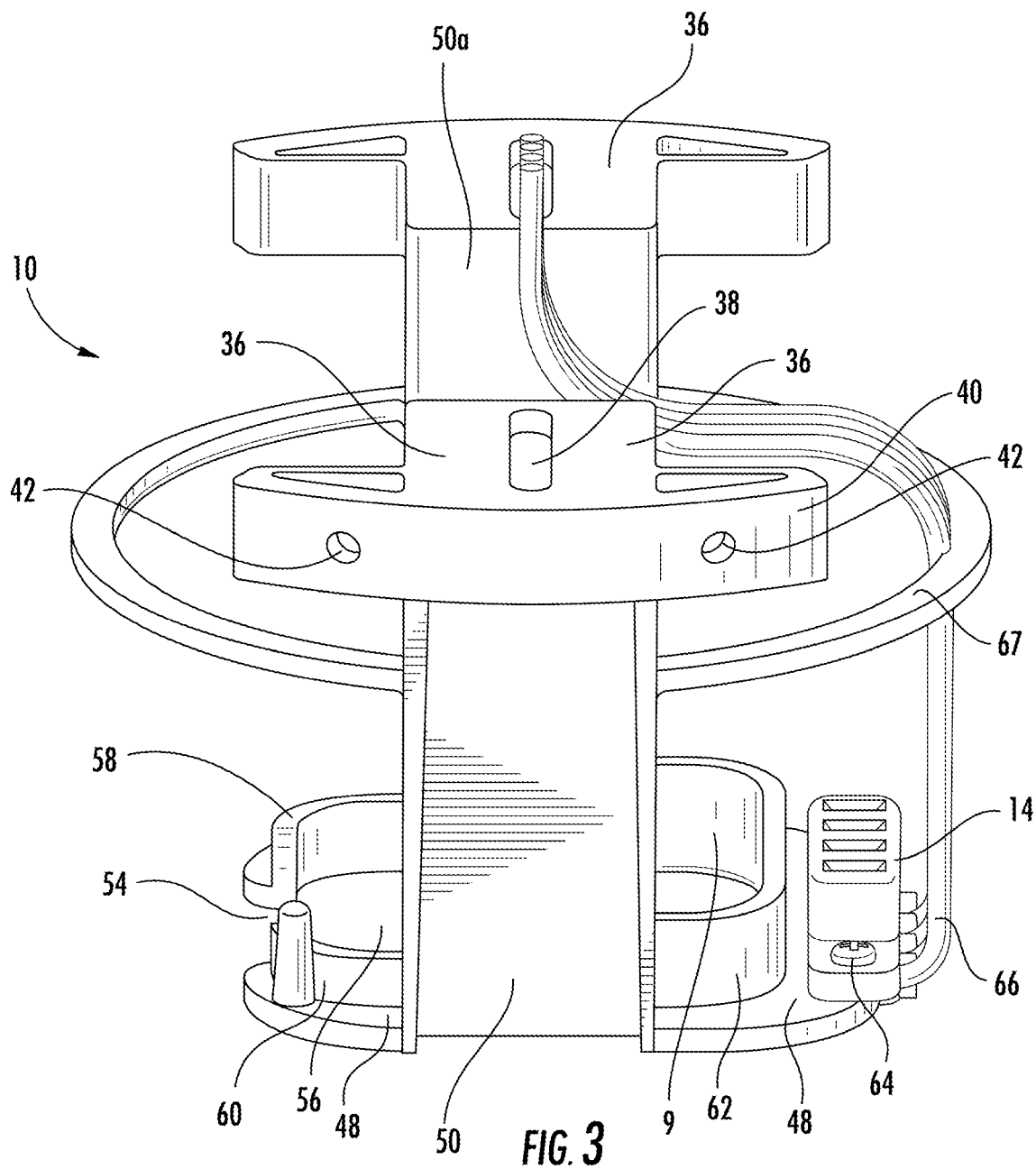
FIG. 3 shows a side perspective view of one embodiment of a mounting bracket for use in some embodiments of the present invention.
Figure 4:
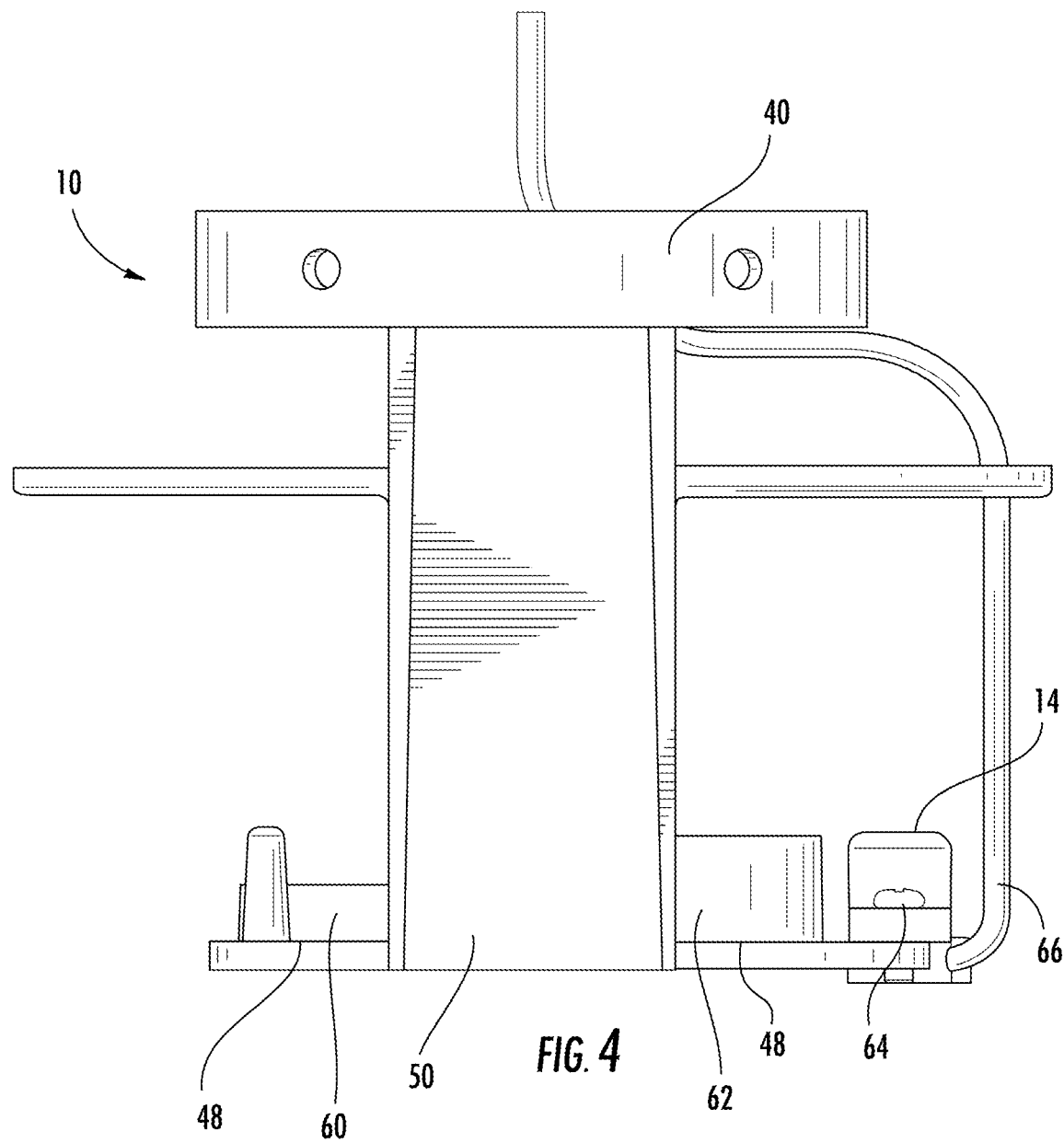
FIG. 4 shows a side view of one embodiment of a mounting bracket for use in some embodiments of the present invention.
Figure 5:
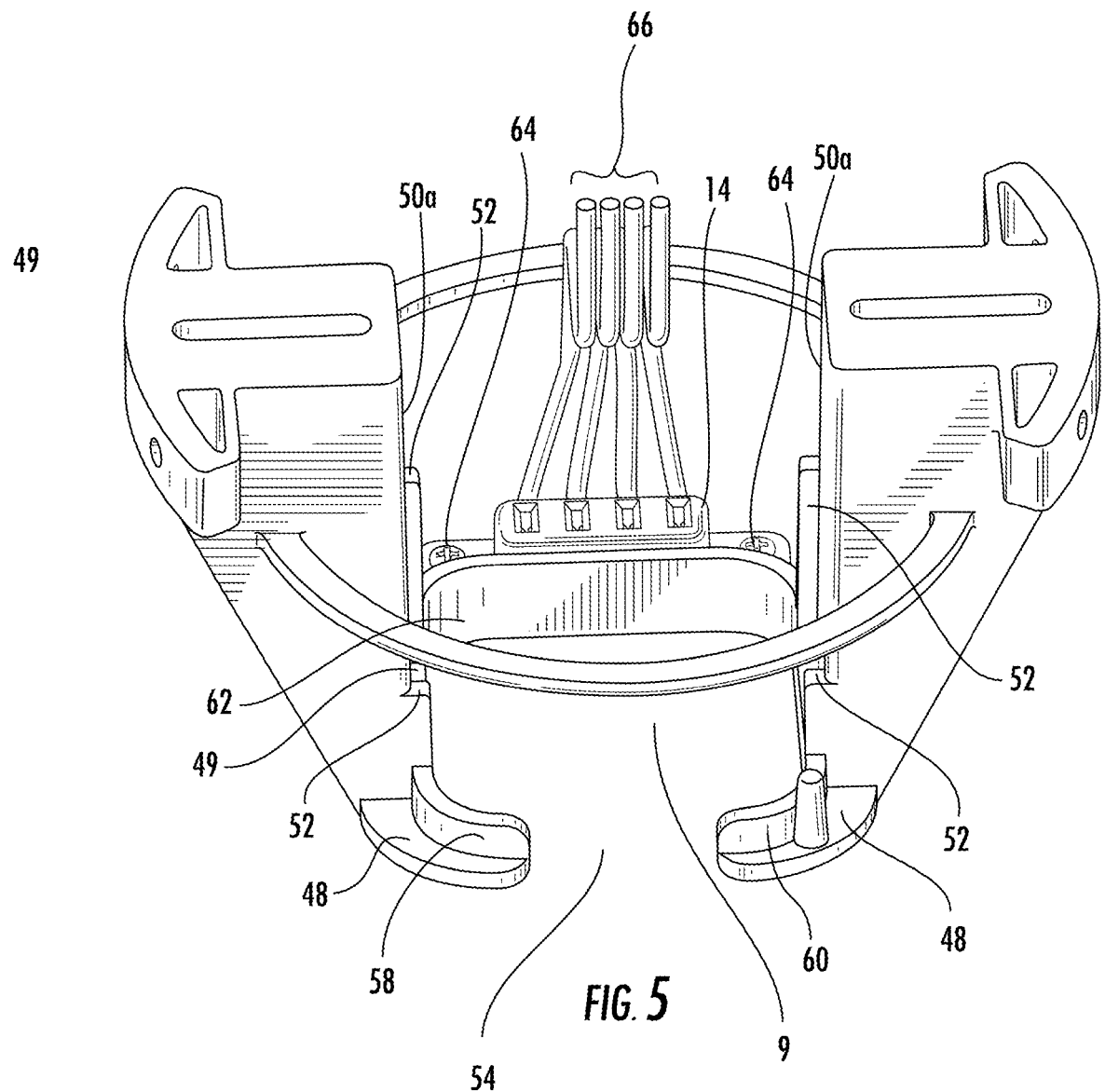
FIG. 5 shows a front perspective view of one embodiment of a mounting bracket for use in some embodiments of the present invention.

FIGS. 3-5 illustrate one embodiment of a mounting bracket 10 that can be used in various embodiments of the present invention. The top portion of the mounting bracket 10 comprises two upper surfaces 36 that are adjacent to the ceiling and/or electrical junction box when the mounting bracket 10 is installed. Rather than having two upper surfaces as shown, alternative embodiments of mounting brackets can include a single upper surface (e.g., a ring-shaped upper surface, a square-shaped upper surface, an arc-shaped upper surface, etc.) or more than two upper surfaces. The number of upper surfaces can depend on a number of factors including, for example, the desired number of connection points for the mounting bracket 10, material costs, the weight of the fan, light or other electrically-powered device to be supported, and other features of the mounting bracket 10. In the embodiment shown, each of the upper surfaces 36 is provided with an opening 38. The openings 38 are adapted to receive a screw or other fastener to secure the mounting bracket 10 to a ceiling and/or an electrical junction box. For example, an electrical junction box may be provided with threaded openings to receive screws that pass through the openings 38 to secure the mounting bracket 10 to the electrical junction box. In the embodiment shown in FIGS. 3-5, the openings 38 are in the form of slots, though those of skill in the art will recognize that other shaped openings (e.g., circular) could also be used. Likewise, other techniques for coupling the mounting bracket to the ceiling, support structure, and/or electrical junction box can be used in other embodiments.

In the embodiment shown, there are two upper side surfaces 40 that are proximate the upper surfaces 36 of the mounting bracket. As noted above, the number of upper surfaces in a mounting bracket may vary, and the number of upper side surfaces may likewise vary. In the embodiment shown, the upper side surfaces 40 are curved and include a plurality of openings 42. The curved upper side surfaces 40 and plurality of openings 42 facilitate connection of the canopy to the mounting bracket 10 after the hangable structure 12 is positioned in the mounting bracket 10 and the electrical connectors 14,16 are engaged. In the embodiment shown, the curved upper side surfaces 40 are designed to coincide with an inner side surface of the canopy 34, and the canopy includes a plurality of openings 44 that align with the plurality of openings 42 in the upper side surfaces 40. Likewise, the canopy 34 can be secured to the mounting bracket 10 using a plurality of fasteners 46 (e.g., screws) that pass through the openings 44 in the canopy 34 and the openings 42 in the upper side surfaces 40 as seen, for example, in FIGS. 16-17. Other techniques known to those of skill in the art can also be used to secure a canopy to a mounting bracket depending on the size and shape of the canopy, the number of desired connection points between the canopy and the mounting bracket, the desired fastening method, and others.

Mounting brackets used in embodiments of the present invention can comprise a receiving portion. The receiving portion of the mounting bracket can be designed to facilitate placement of, and to provide support to, the mating member of the hangable structure. The receiving portion can have a number of different configurations depending on factors such as the materials of construction, the weight of the fan, light, or other electrical device to be supported, the size and shape of the mating member, the size and shape of any down-rod or other portions of the hangable structure, the location of the electrical connectors, the ceiling or supporting structure to which the mounting bracket is to be mounted, and others.

In the embodiment shown in FIGS. 3-5, the receiving portion 9 of the mounting bracket 10 comprises a number of features to assist in placement and support of the mating member 13. Multiple sidewalls 50 extend from the upper surfaces 36 to a lower surface 48 of the mounting bracket 10. While multiple sidewalls 50 are shown in the Figures, in other embodiments, fewer or more sidewalls can extend from an upper surface to a lower surface. The number of sidewalls can depend on a number of factors including the materials used to construct the mounting bracket, the thickness of the sidewall(s), the number of upper surface(s), the position, shape, and configuration of the lower surface, any features on the lower surface, the weight of the fan, light, or other device being supported, and others. In the embodiment shown, the two inner sidewalls 50a are provided with a plurality of ridges 52. On each side, a stepped-up surface 49, the inner sidewall 50a, and the ridges 52 form a slot that can receive a corresponding protrusion 76 on a sidewall of the mating member 13 (see, for example, FIGS. 10, 18, and 19). In this embodiment, placement of the protrusions 76 in the slots on the inner sidewalls 50a assists with placement and retention of the mating member 13 in the mounting bracket 10.

Figure 6:
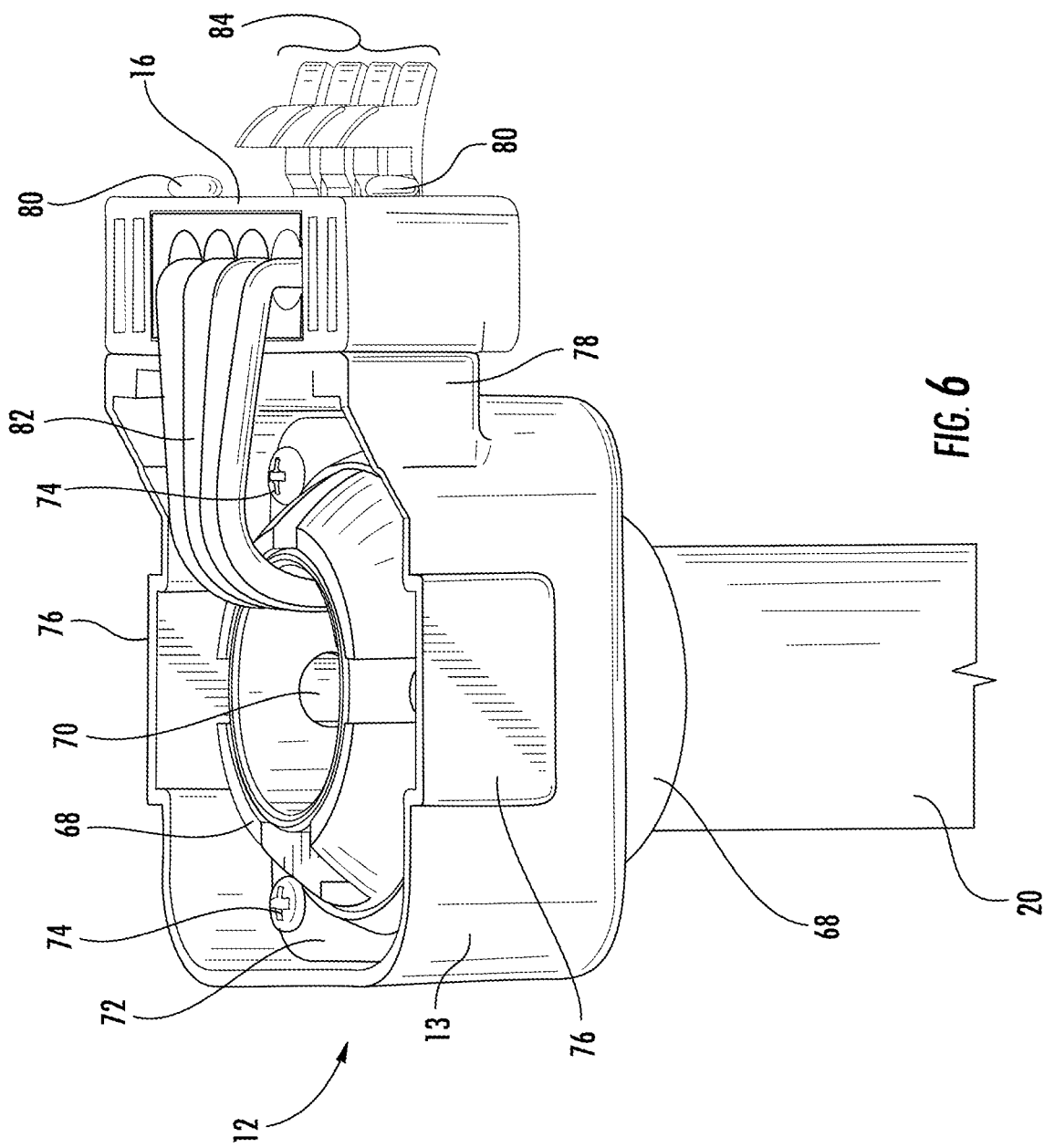
FIG. 6 shows a side perspective view of one embodiment of a hangable structure for use in some embodiments of the present invention.

While the receiving portion 9 forms an opening or hollow center 56 (e.g., to permit a down-rod or other structure to extend downward from the mounting bracket 10), the receiving portion 9 may also comprise an opening 54, in some embodiments, to assist with receiving the hangable structure 12. In other words, instead of forming a complete perimeter around the hollow center 56, at least a portion of the structure forming the receiving portion 9 may have one or more openings 54 to permit a portion of the hangable structure 12 (e.g., a lower portion of the hangable structure or the down-rod 20) to slide into the hollow center 56. The one or more openings 54 may also be sized to help retain the mating member 13 in the proper alignment once positioned on the mounting bracket. For example, as shown in FIG. 6, the hangable structure 12 may have a ball or ball-like structure 68 positioned in the mating member 13 and extending out the bottom of the mating member 13.

The opening 54 of the receiving portion 9 may be sufficiently sized to allow a lower portion of the hangable structure (e.g., the portion of the ball-like structure 68 extending out the bottom of the mating member 13 and/or the down-rod 20) to pass through the opening 54 and into the receiving portion 9 while the mating member 13 passes above the opening 54. In some embodiments, the opening 54 of the receiving portion 9 may be sized to be smaller than the width of the surface of the mating member 13 adjacent to the opening 54 when the mating member 13 is properly aligned so as to help retain the mating member 13 in the receiving portion 9.

Likewise, the hollow center 56 can be dimensioned and/or shaped so as to permit a lower portion of the hangable structure (e.g., the portion of the ball-like structure 68 extending out the bottom of the mating member 13 and/or the down-rod 20) to pass downwardly through it as a result of gravity but to prevent the mating member 13 from doing so. In other words, the mating member 13 may be shaped differently from, and/or sized larger than, the hollow center 56 so as to interfere with gravity influenced-passage of the mating member 13 entirely through the hollow center 56 of the receiving portion 9.

In the embodiment shown in FIGS. 1-19, the lower surface 48 and peripheral walls 58,60,62 form the hollow center 56 and also includes the opening 54. While the lower surface 48 is in the lower portion of the mounting bracket 10 in the embodiment shown, it should be understood that a similar surface forming a hollow center and including a similar opening could be positioned at different locations within the mounting bracket (e.g., above other structure) such that the surface does not necessarily need to be in the lower portion.

In some embodiments, the receiving portion can comprise a support surface. The support surface, in some embodiments, can form the hollow center 56 and can include the opening 54. The support surface can be configured such that a mating member of a hangable structure rests against the support surface as discussed further below. In some embodiments, the support surface can comprise multiple surfaces.

In the embodiment shown in FIGS. 1-19, the receiving portion 9 comprises a plurality of peripheral walls 58,60,62 that are provided on the lower surface 48. The peripheral walls 58,60,62 in this embodiment help form the hollow center 56. Two of the peripheral walls 58,60 are adjacent the opening 54. In this embodiment, the other peripheral wall 62 is generally U-shaped and slightly taller than the other two peripheral walls 58,60 as shown in FIG. 4. One or more of the peripheral walls 58,60,62 can be a support surface in various embodiments. As discussed below, side surfaces of the mating member 13 rest or are positioned against an inner surface of the peripheral walls 58,60,62. In addition, a portion of the mating member can also rest against an upper surface of the peripheral wall 62. In this manner, the peripheral walls 58,60,62 assist in keeping the mating member 13 in proper alignment.

Rather than using a plurality of peripheral walls (with or without a lower surface), other structural arrangements can also be provided to form a hollow center, to form an opening for receiving the hangable structure, and/or to provide a support surface for a mating member. For example, in other embodiments, a receiving portion can comprise a single peripheral wall or a single peripheral rim with an opening that can serve as a support surface for a mating member.

The mounting bracket comprises a first electrical connector in various embodiments. In the embodiment shown, the first electrical connector 14 is coupled to the lower surface 48 of the mounting bracket 10. Two screws are used to connect the first electrical connector 14 to the lower surface 48 in the embodiment shown in FIGS. 3-5. Various other techniques known to those of skill in the art can be used to couple the electrical connector to a mounting bracket including, for example, use of an adhesive as well as fasteners other than screws. A plurality of wires 66 are electrically coupled to the first electrical connector 14. The wires 66 can be used to electrically couple the first electrical connector 14 to a source of alternating-current electric power (e.g., house power, power from a generator and other sources known to those of skill in the art). Wire nuts or other techniques known to those of skill in the art can be used to electrically couple the wires 66 to corresponding wires that are connected to the source of alternating-current electric power.

In being electrically coupled to a source of alternating-current electric power, the first electrical connector 14 can provide electricity to devices that are connected to the second electrical connector 16 when the first and second electrical connectors 14,16 are electrically coupled. In the embodiment shown, the first electrical connector 14 is a female connector and can be engaged or connected with a corresponding male electrical connector. In other embodiments, the first electrical connector 14 can be a male connector and can be engaged or connected with a corresponding female electrical connector.

In the embodiment shown in FIGS. 1-19, four wires 66 are provided. By way of example, two wires (black and white) can provide electricity to the fan motor, one wire (blue) can provide electricity to a light, and one wire can be a ground (green). While four wires 66 are shown in the embodiment of FIGS. 1-19, other wire arrangements can be provided. For example, in some embodiments, only two or three wires may be utilized.

In some embodiments, mounting brackets can be provided with structure to facilitate use of a remote control to operate the ceiling fan, lighting fixture, or other electrically-powered device. For example, the mounting bracket 10 shown in the embodiment of FIGS. 1-19 is provided with a ring 67 to provide structural support for a remote control receiver. A remote control receiver can be placed on the ring 67 (typically, after installation of the mounting bracket on a ceiling or other supporting structure). As known to those of skill in the art, a remote control receiver can receive wireless signals from a remote control to operate the electrically-powered device (e.g., turn a ceiling fan on/off, adjust fan speed, turn light on/off, adjust brightness, etc.). The remote control receiver can be electrically incorporated into various systems of the present invention using techniques known to those of skill in the art. While a ring is shown as an exemplary embodiment, structure having other shapes and sizes can also be used. One factor in selecting the size and shape of the structure as well as its location on the mounting bracket is providing sufficient space for a hangable structure to be properly positioned in the receiving portion of the mounting bracket.

Figure 7:
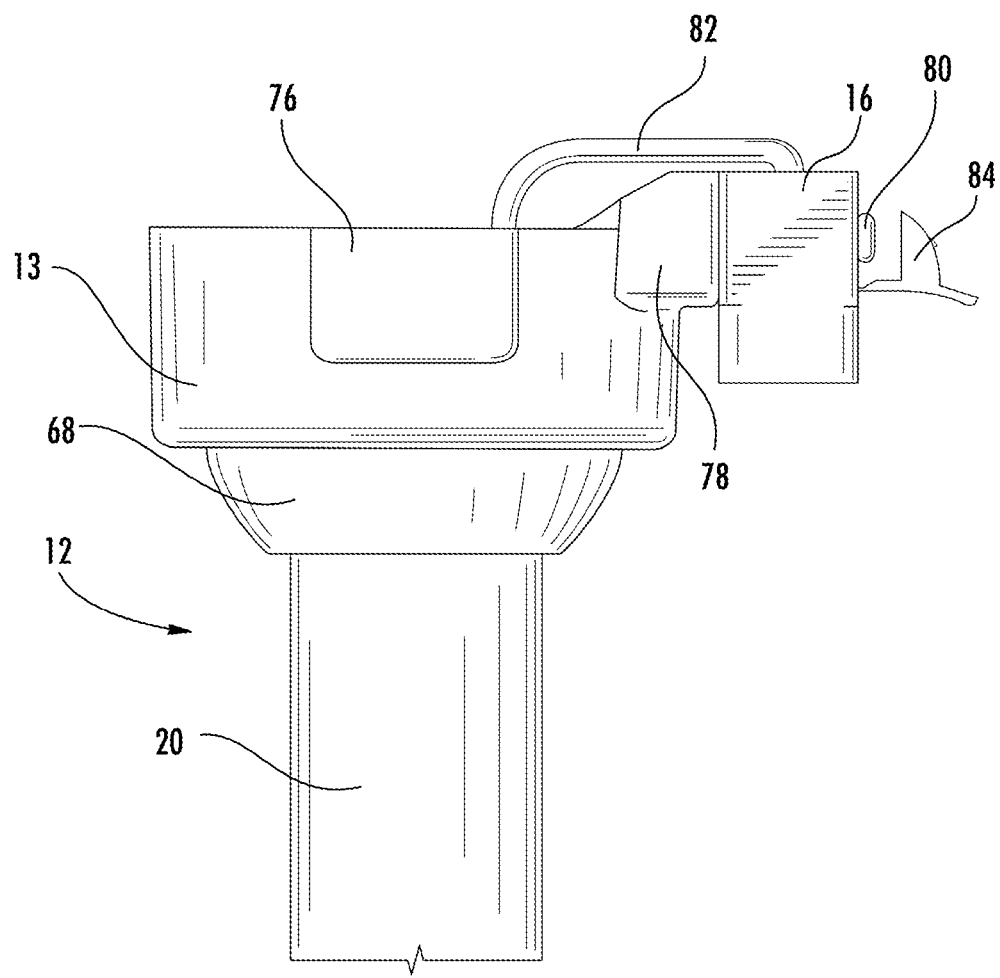
FIG. 7 shows a side view of one embodiment of a hangable structure for use in some embodiments of the present invention.
Figure 8:
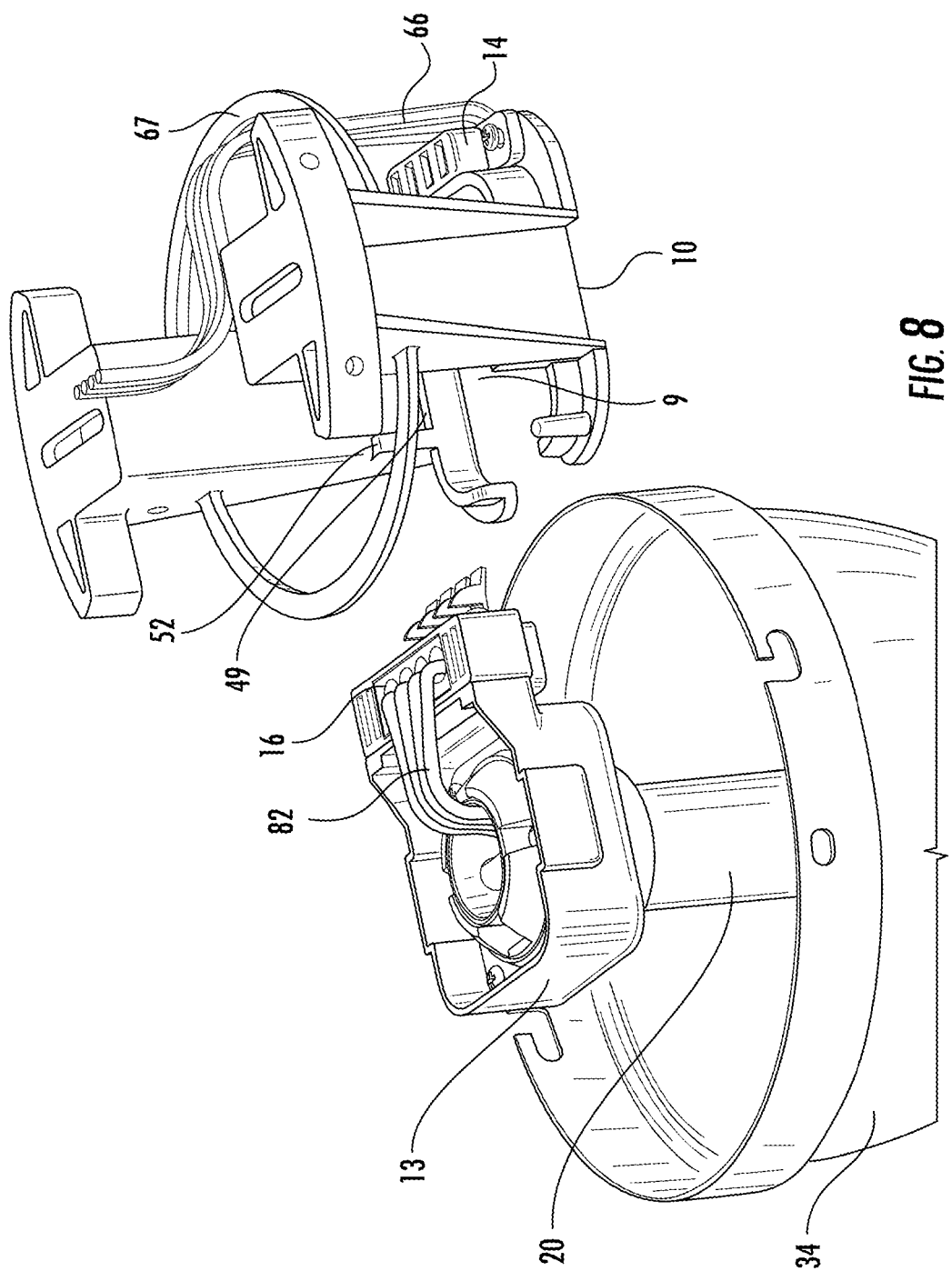
FIG. 8 shows a side perspective view of components of a system for mounting a ceiling fan to a supporting structure according to one embodiment of the present invention.
Figure 9:
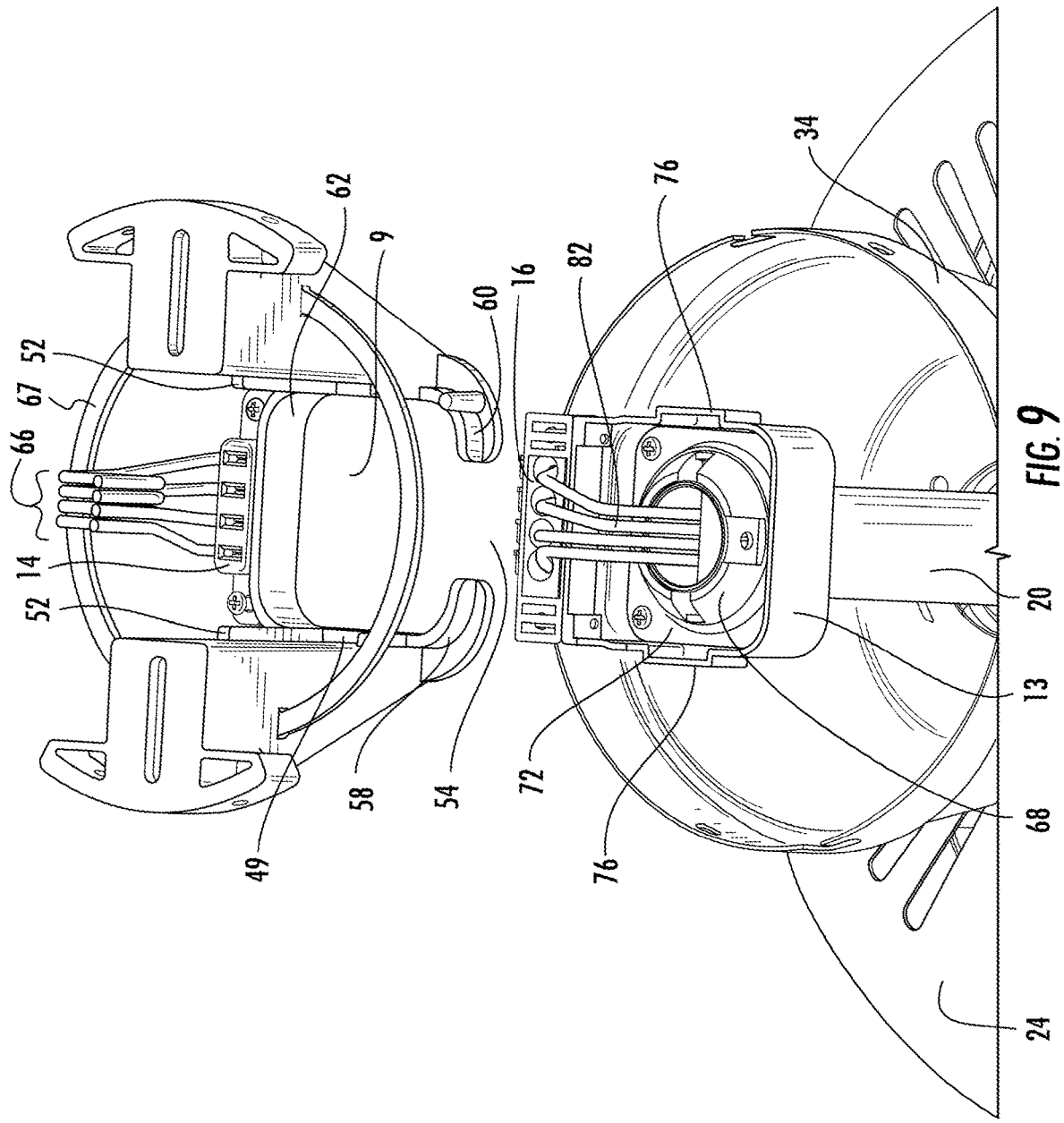
FIG. 9 shows a front perspective view of components of a system for mounting a ceiling fan to a supporting structure according to one embodiment of the present invention.
Figure 10:
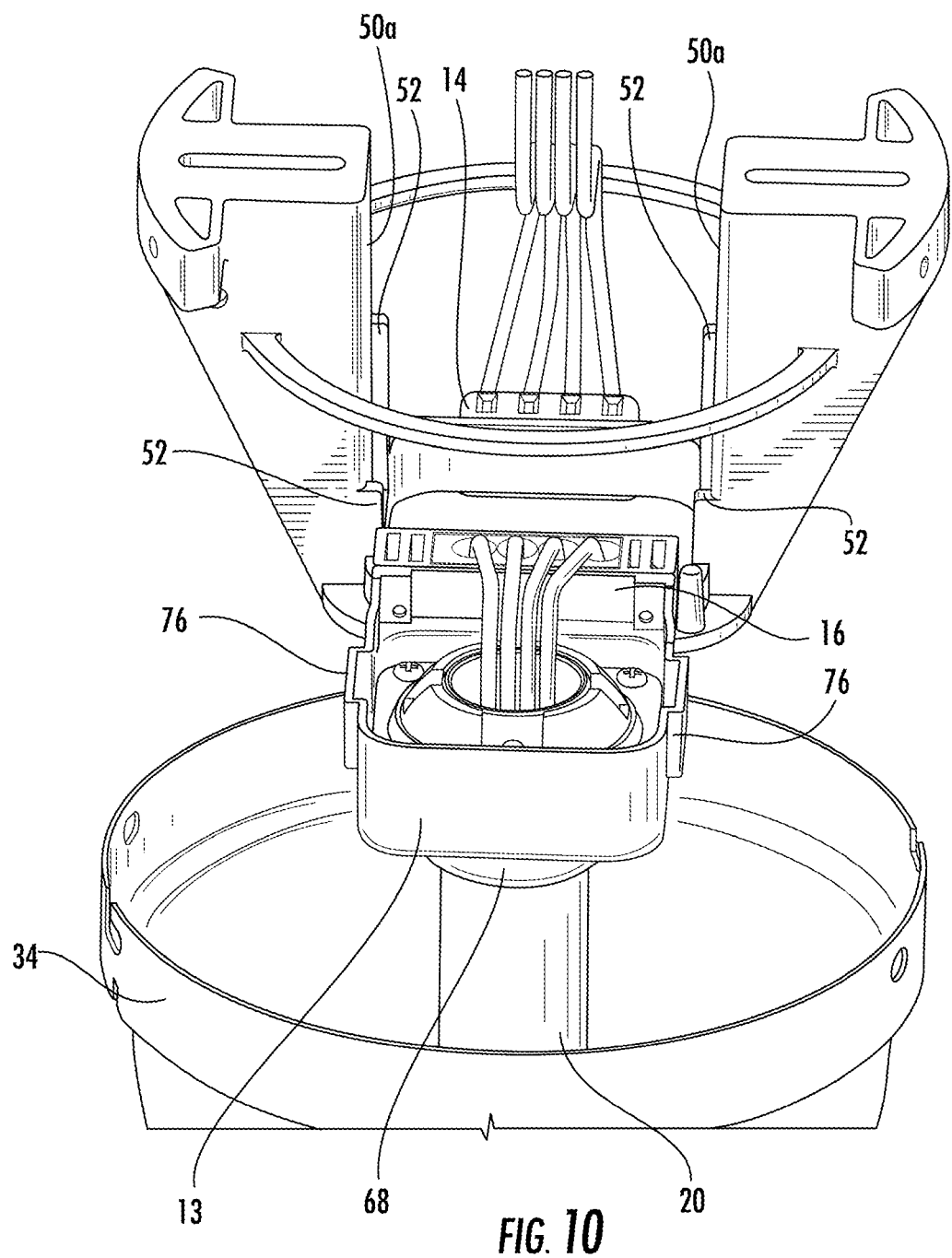
FIG. 10 shows another front perspective view of components of a system for mounting a ceiling fan to a supporting structure according to one embodiment of the present invention.
Figure 11:
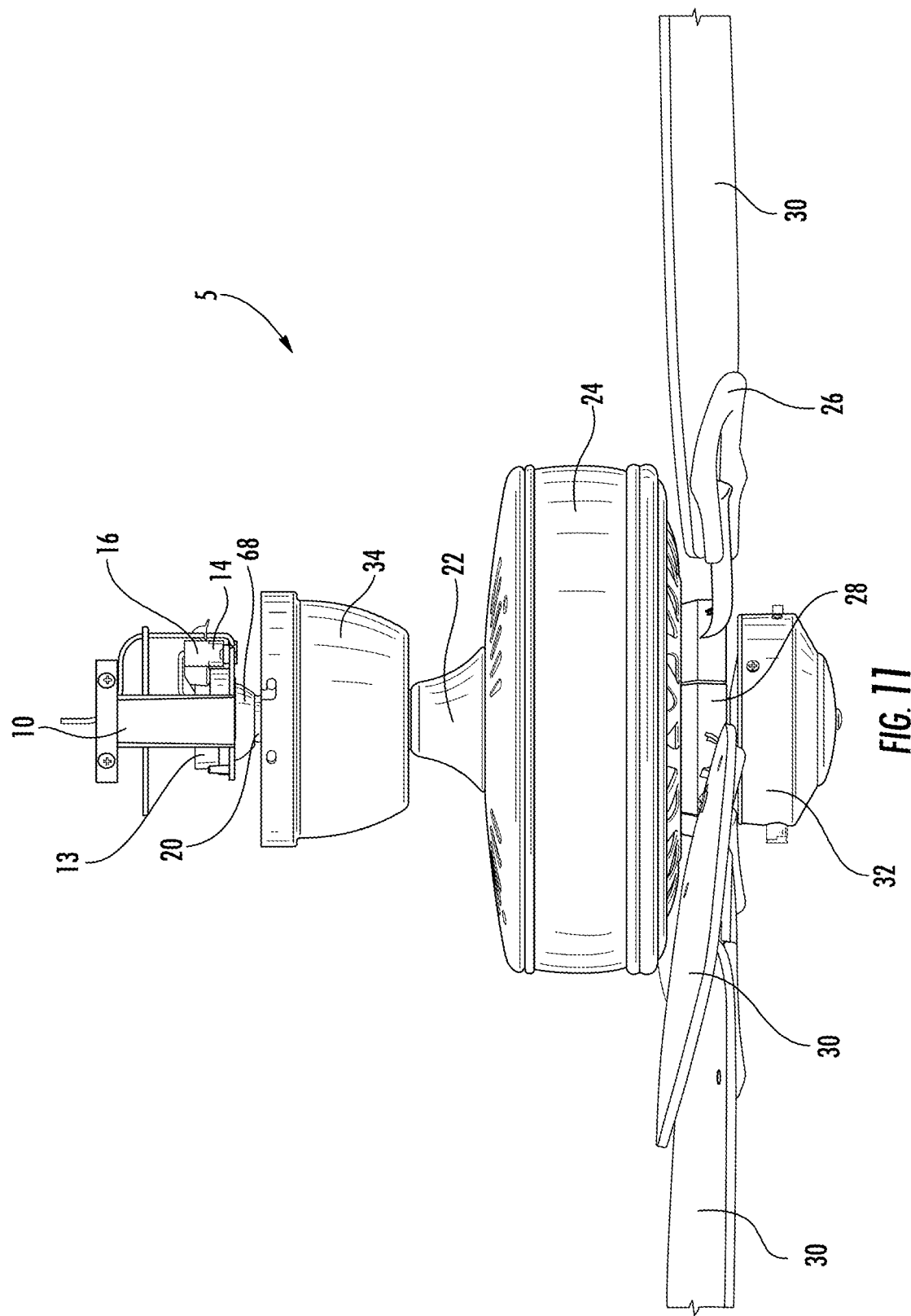
FIG. 11 shows a side view of components of a system for mounting a ceiling fan to a supporting structure with the hangable structure positioned so as to hang from the mounting bracket according to one embodiment of the present invention.
Figure 12:
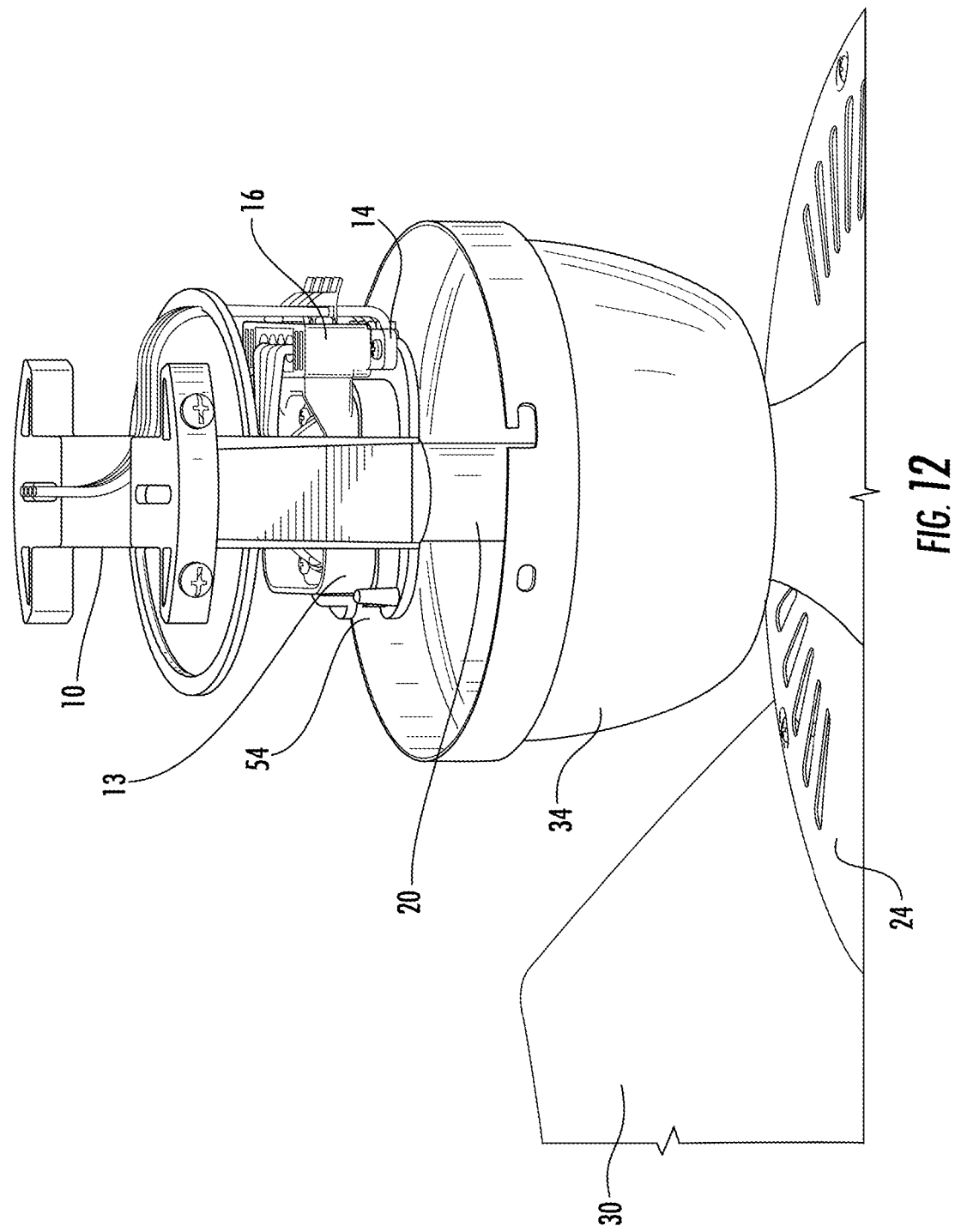
FIG. 12 shows a side perspective view of components of a system for mounting a ceiling fan to a supporting structure with the hangable structure positioned so as to hang from the mounting bracket according to one embodiment of the present invention.
Figure 13:
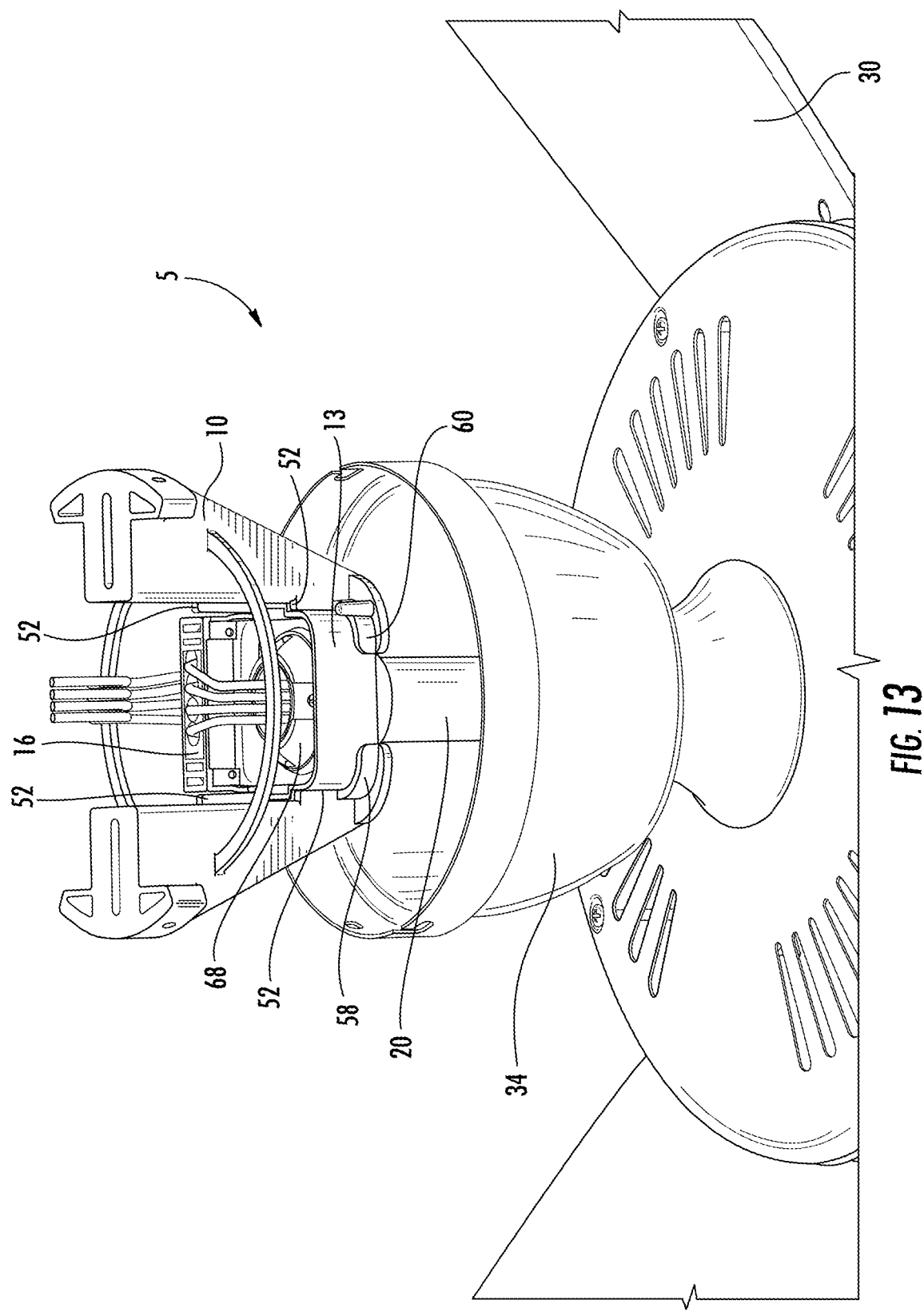
FIG. 13 shows a front perspective view of components of a system for mounting a ceiling fan to a supporting structure with the hangable structure positioned so as to hang from the mounting bracket according to one embodiment of the present invention.
Figure 14:
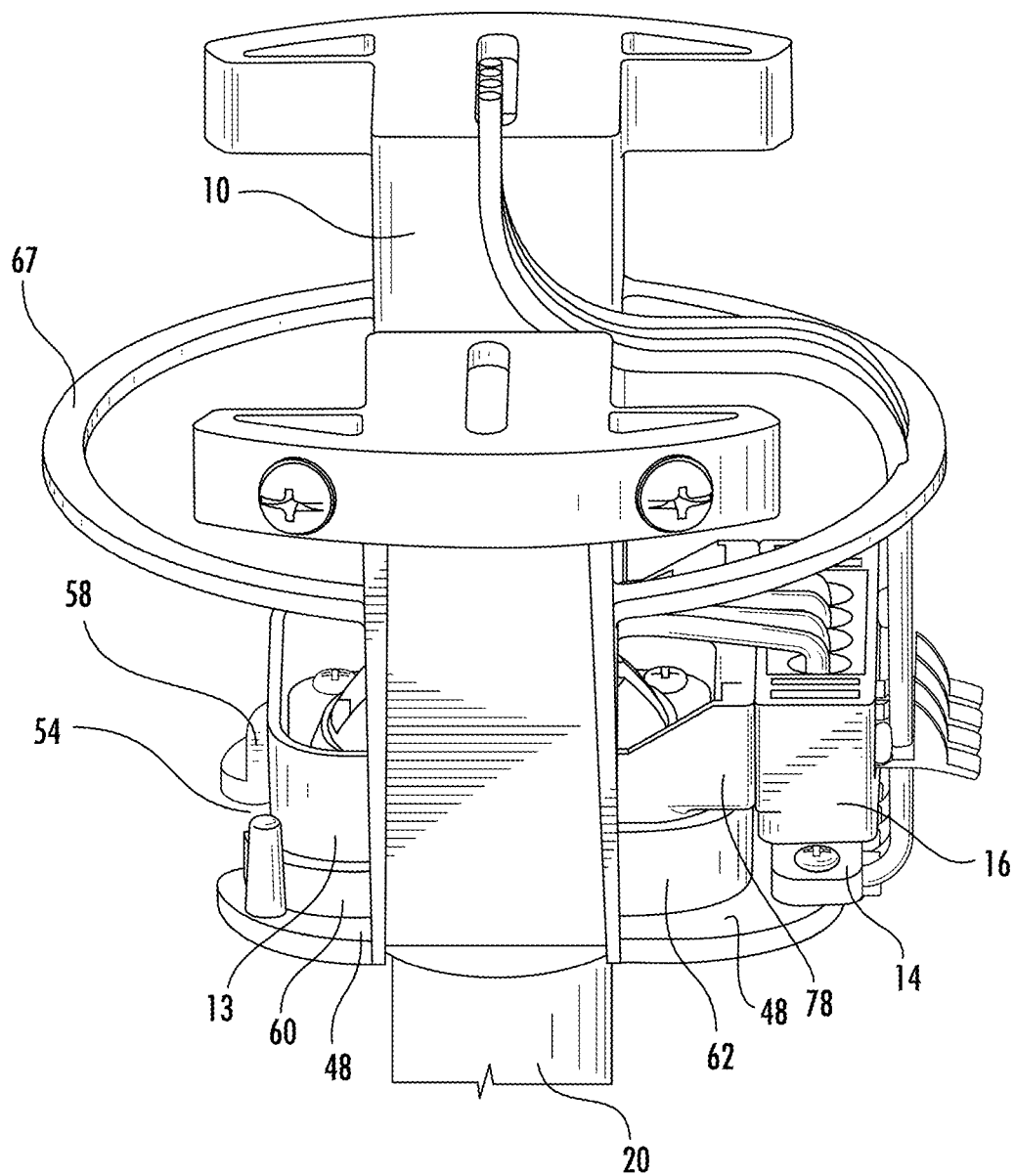
FIG. 14 shows a side perspective view of the hangable structure positioned so as to hang from the mounting bracket of a system for mounting ceiling fans according to one embodiment of the present invention.
Figure 15:
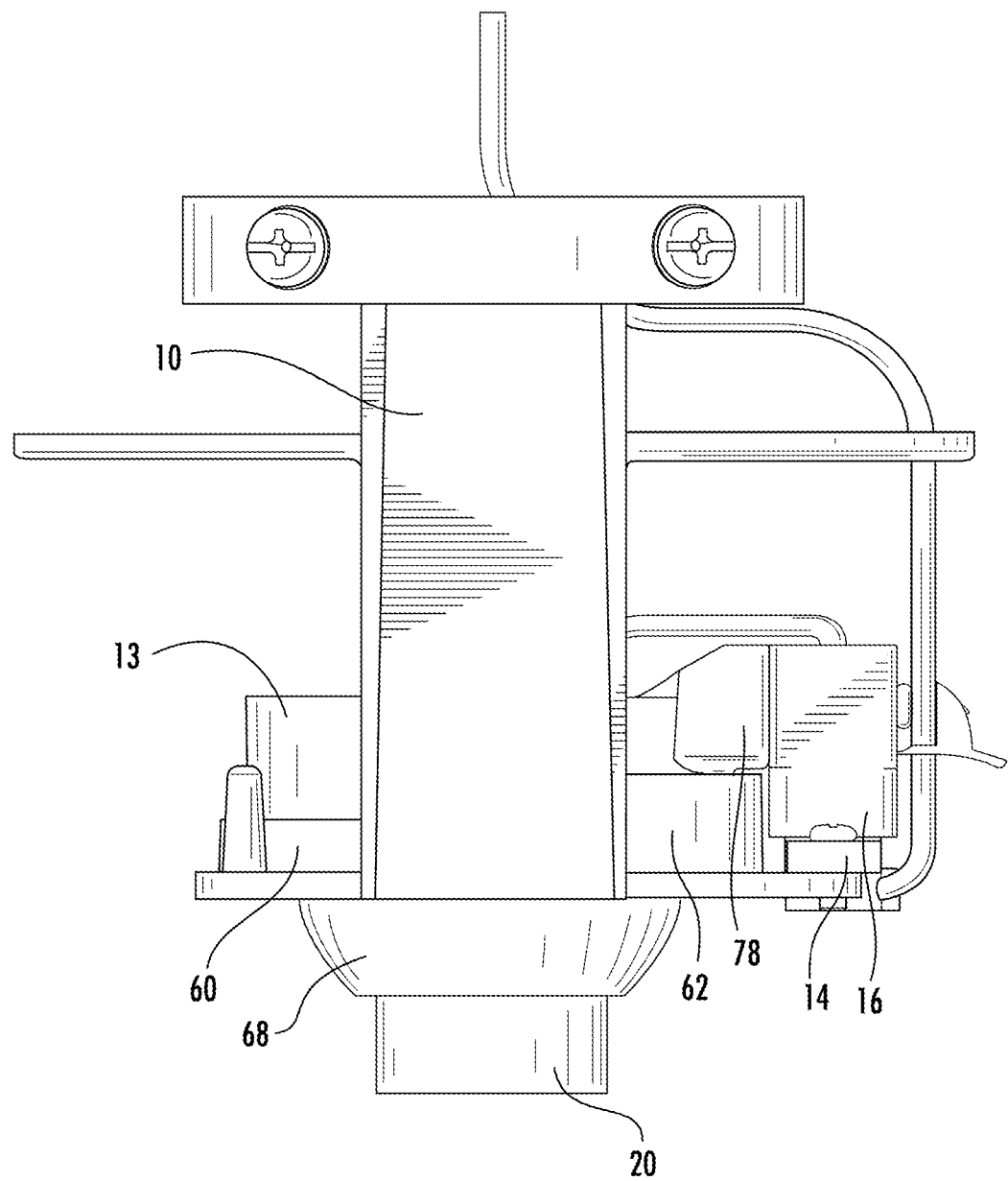
FIG. 15 shows a side view of the hangable structure positioned so as to hang from the mounting bracket of a system for mounting ceiling fans according to one embodiment of the present invention.
Figure 16:
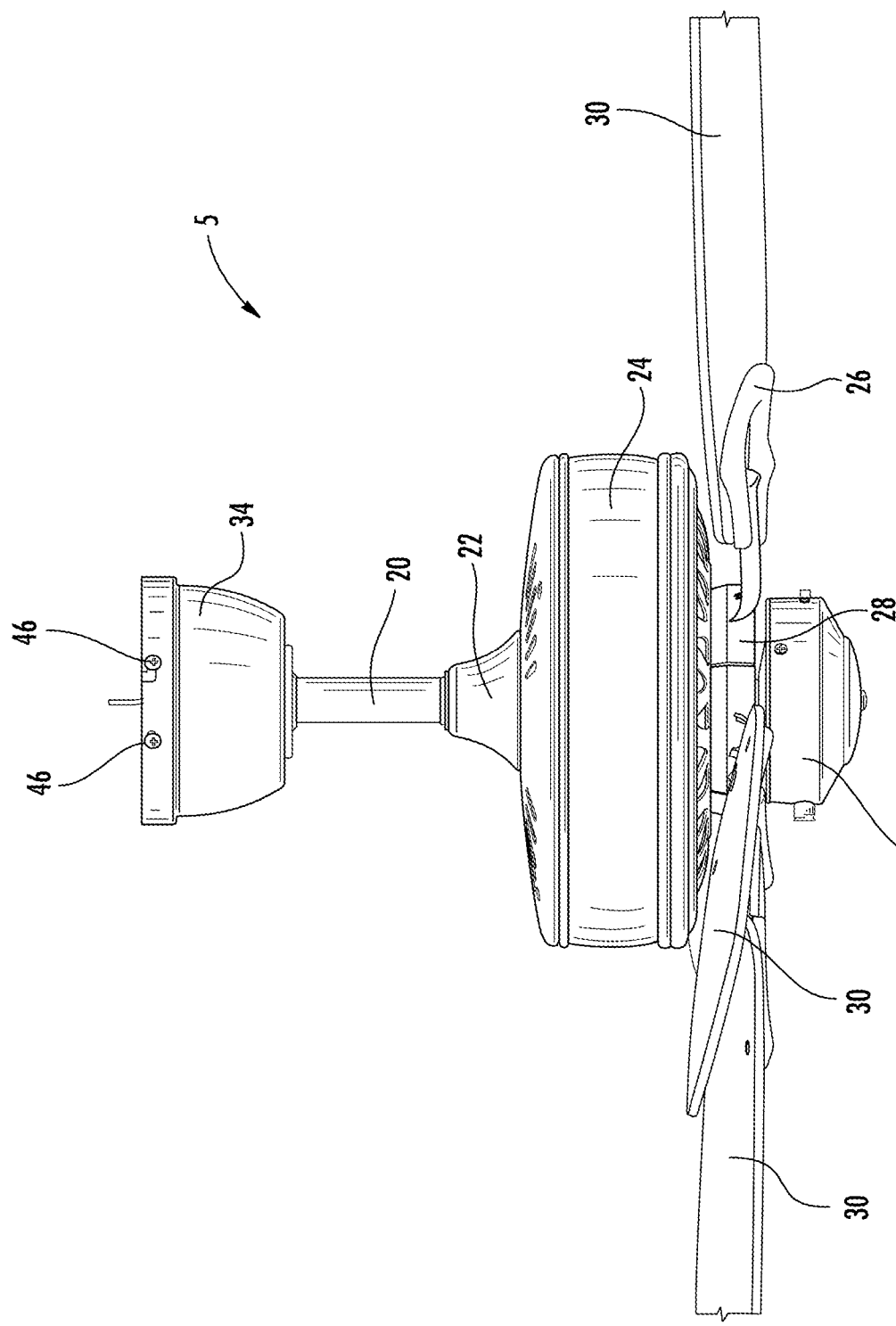
FIG. 16 shows a side perspective view of components of a system for mounting a ceiling fan to a supporting structure with the hangable structure positioned so as to hang from the mounting bracket according to one embodiment of the present invention.
Figure 17:
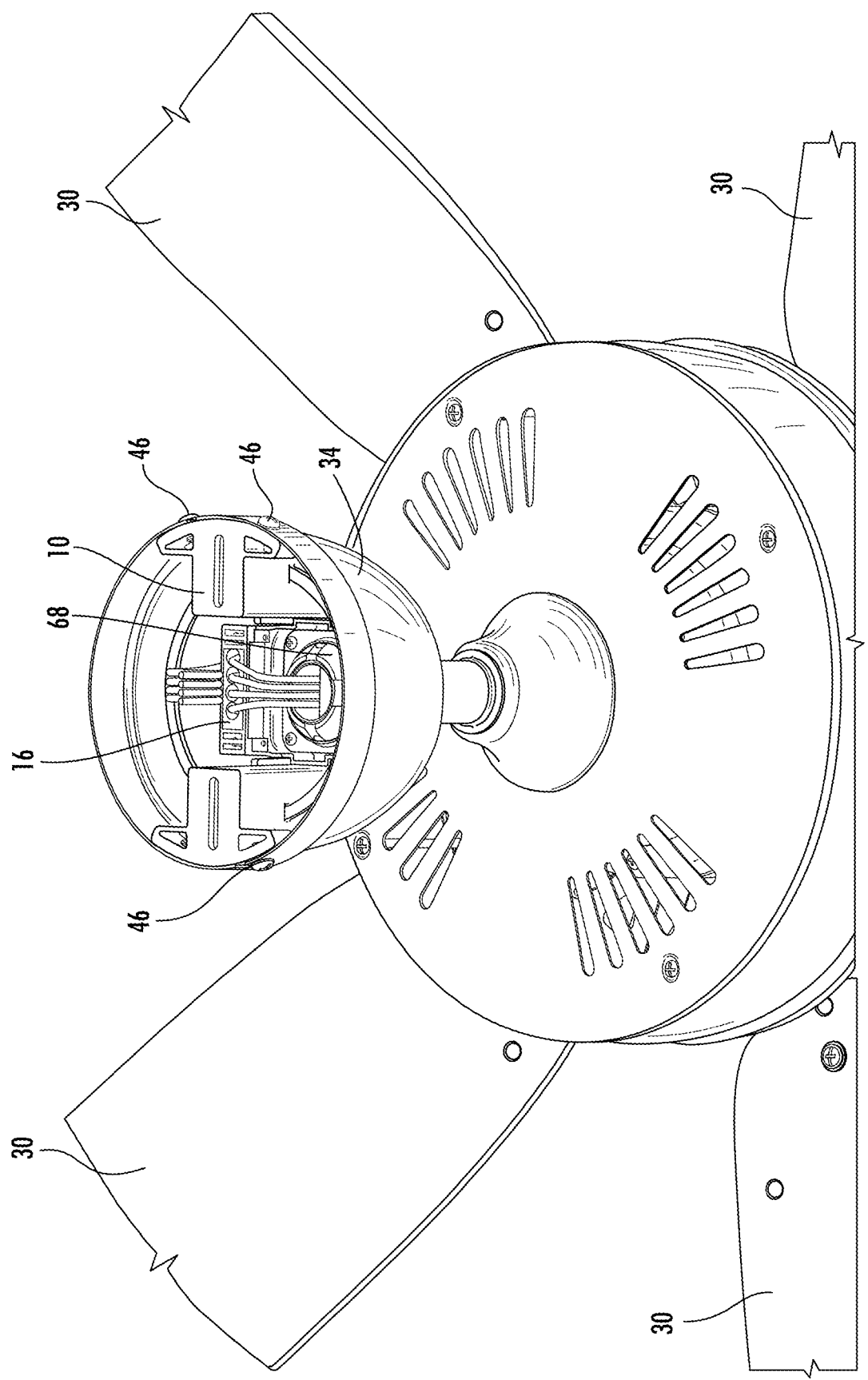
FIG. 17 shows a top perspective view of components of a system for mounting a ceiling fan to a supporting structure with the hangable structure positioned so as to hang from the mounting bracket according to one embodiment of the present invention.
Figure 18:
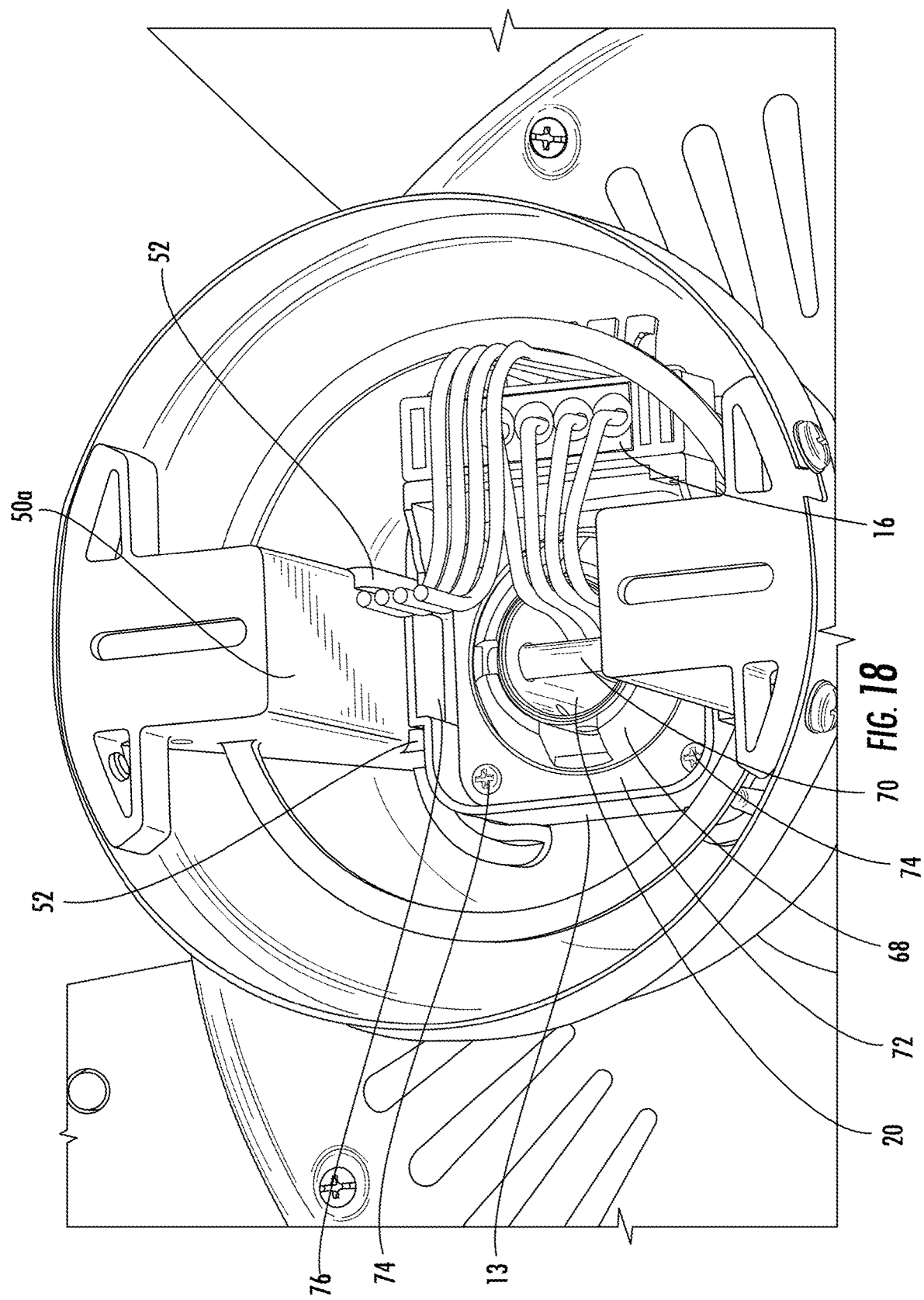
FIG. 18 shows another top perspective view of components of a system for mounting a ceiling fan to a supporting structure with the hangable structure positioned so as to hang from the mounting bracket according to one embodiment of the present invention.
Figure 19:
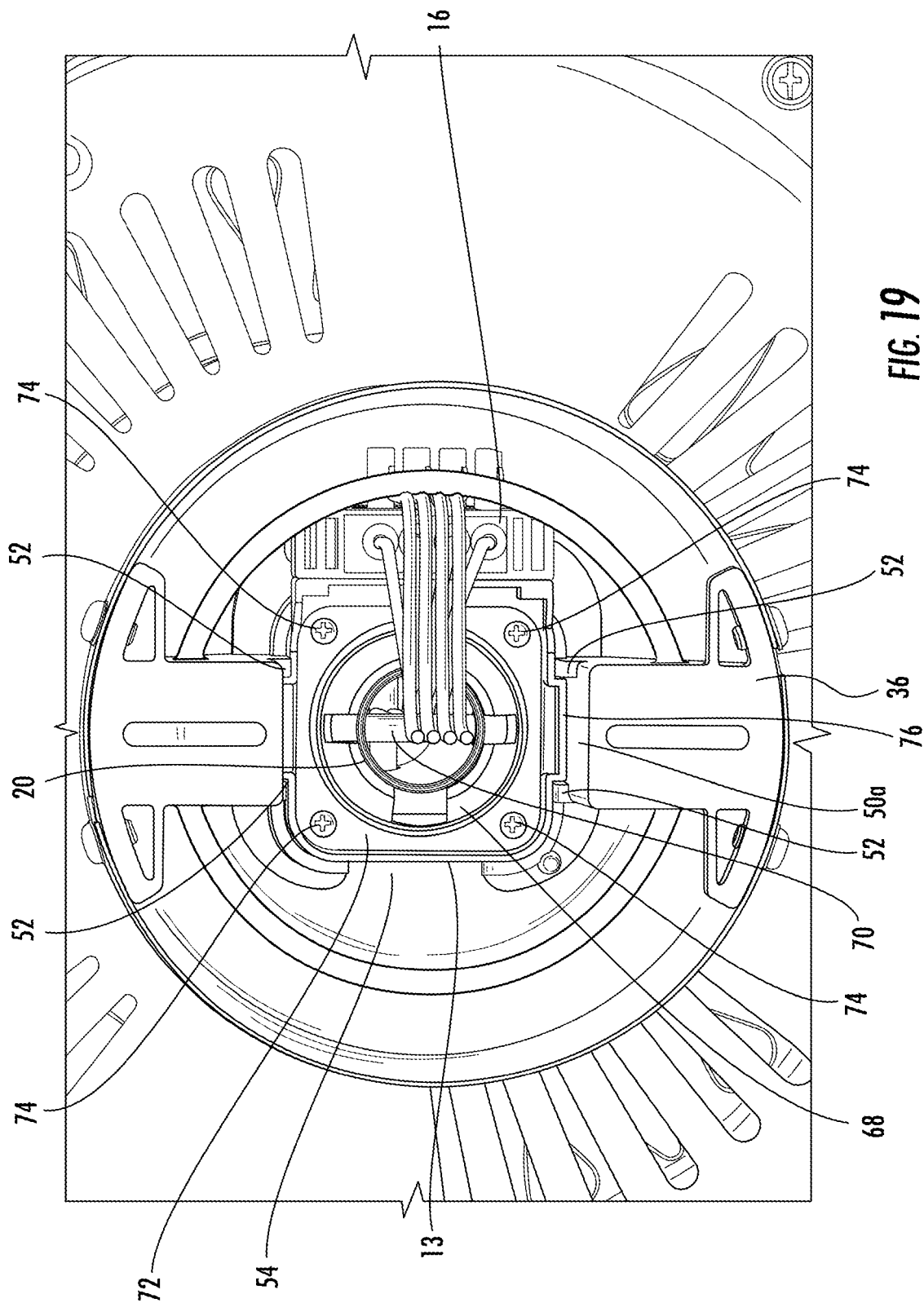
FIG. 19 shows a top view of components of a system for mounting a ceiling fan to a supporting structure with the hangable structure positioned so as to hang from the mounting bracket according to one embodiment of the present invention.
Figure 20:
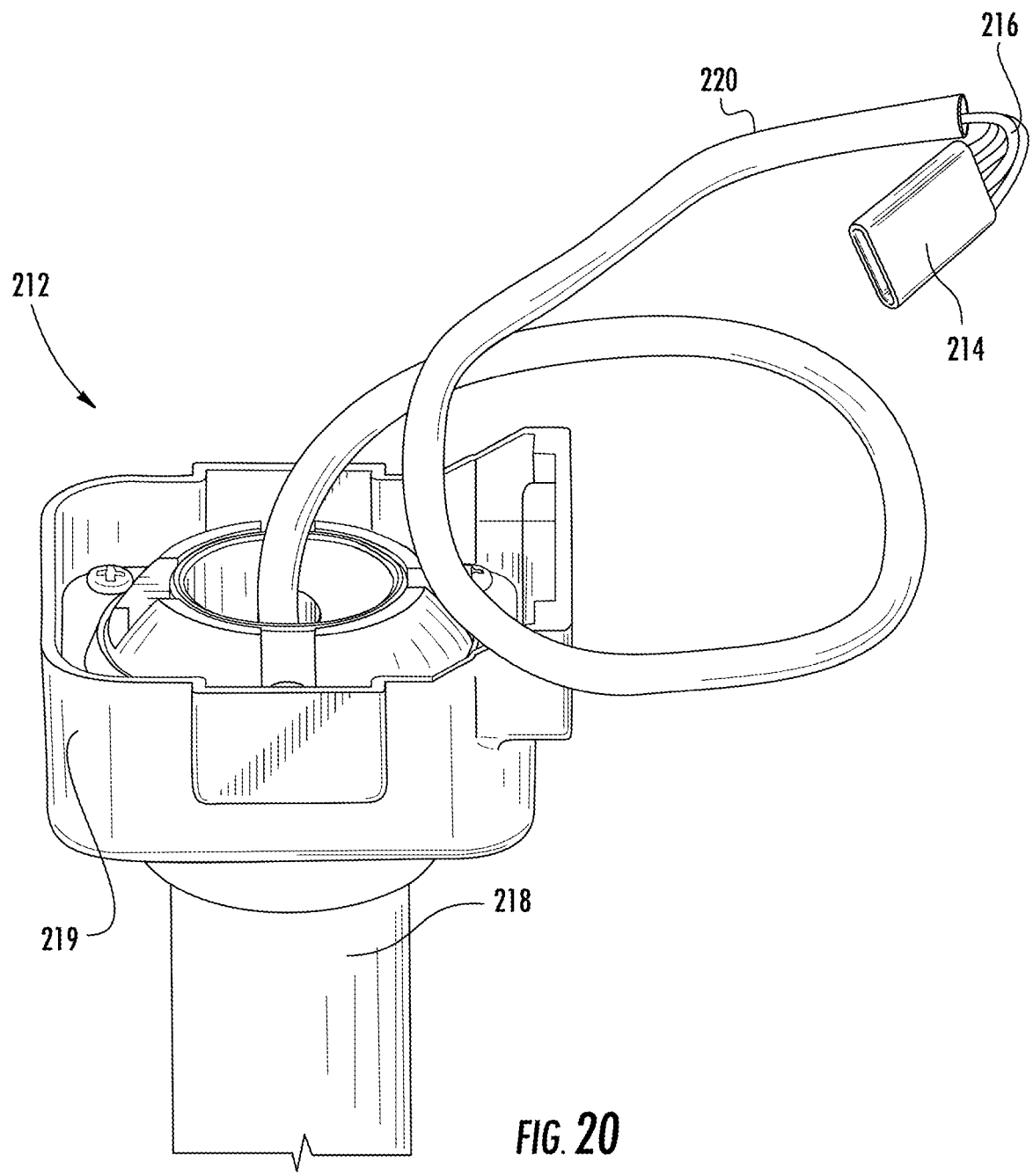
FIG. 20 shows a side perspective view of one embodiment of a hangable structure for use in some embodiments of the present invention.
Figure 21:
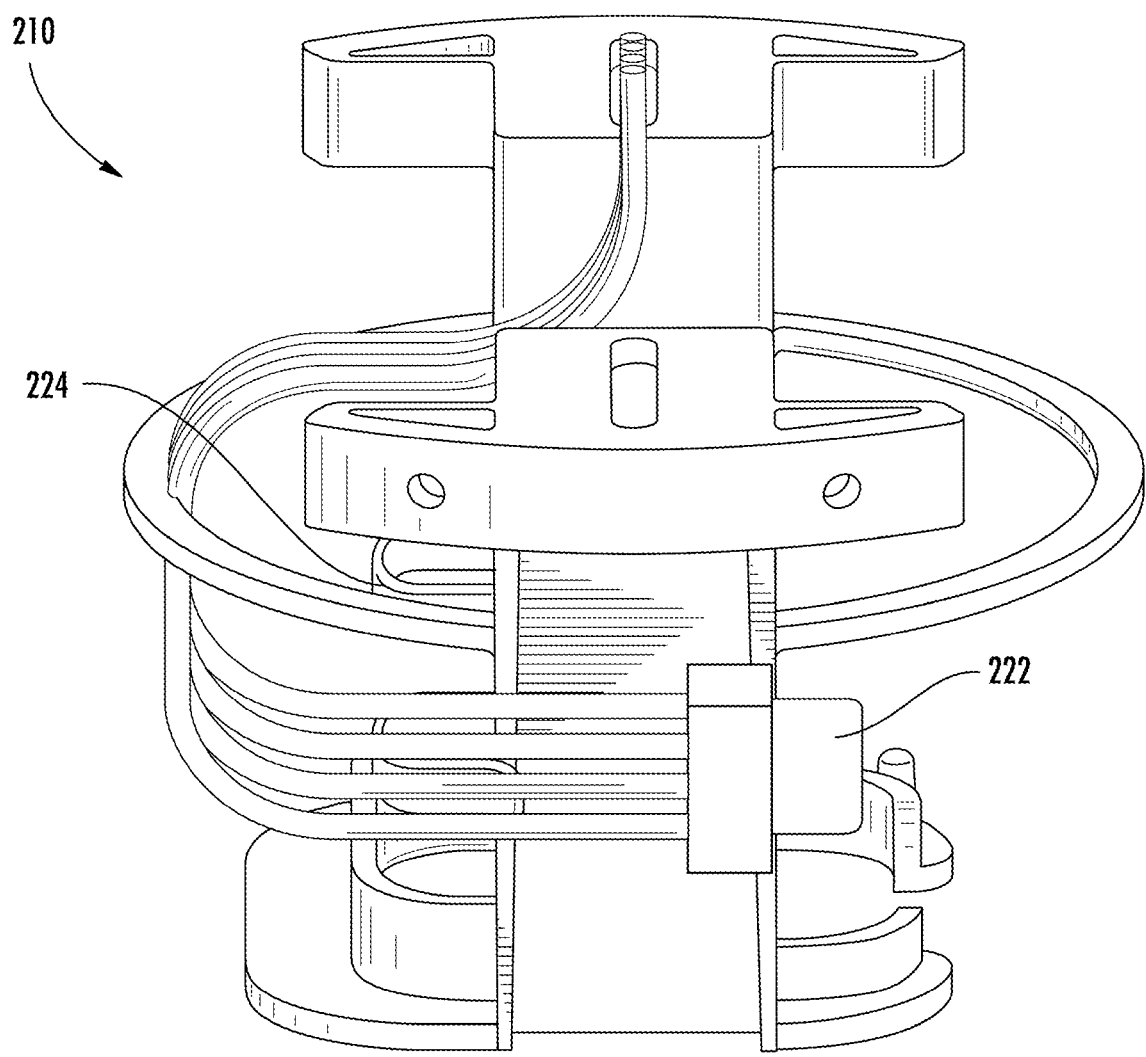
FIG. 21 shows a side perspective view of one embodiment of a mounting bracket for use in some embodiments of the present invention.
Figure 22:
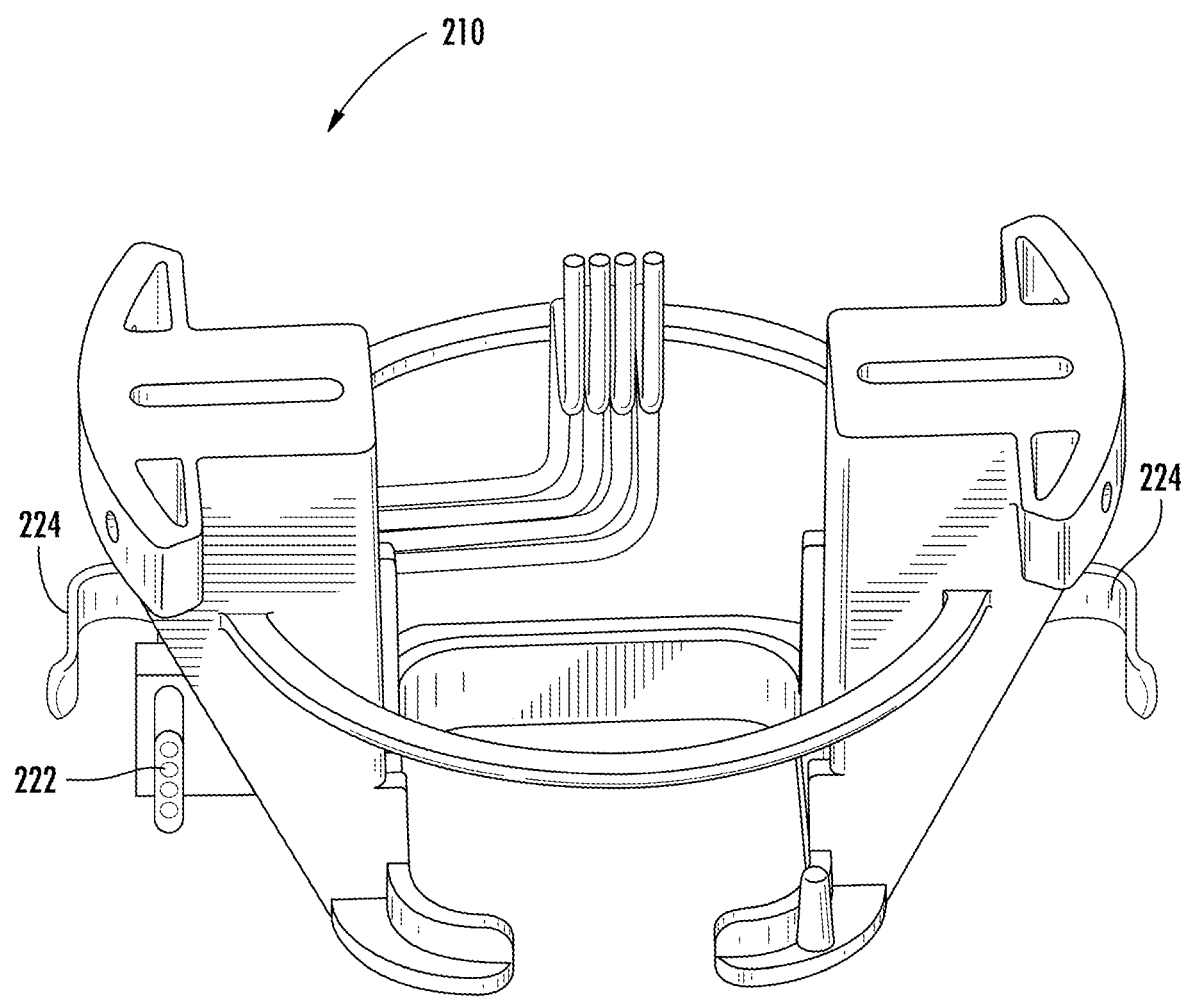
FIG. 22 shows a front perspective view of one embodiment of a mounting bracket for use in some embodiments of the present invention.
Figure 23:
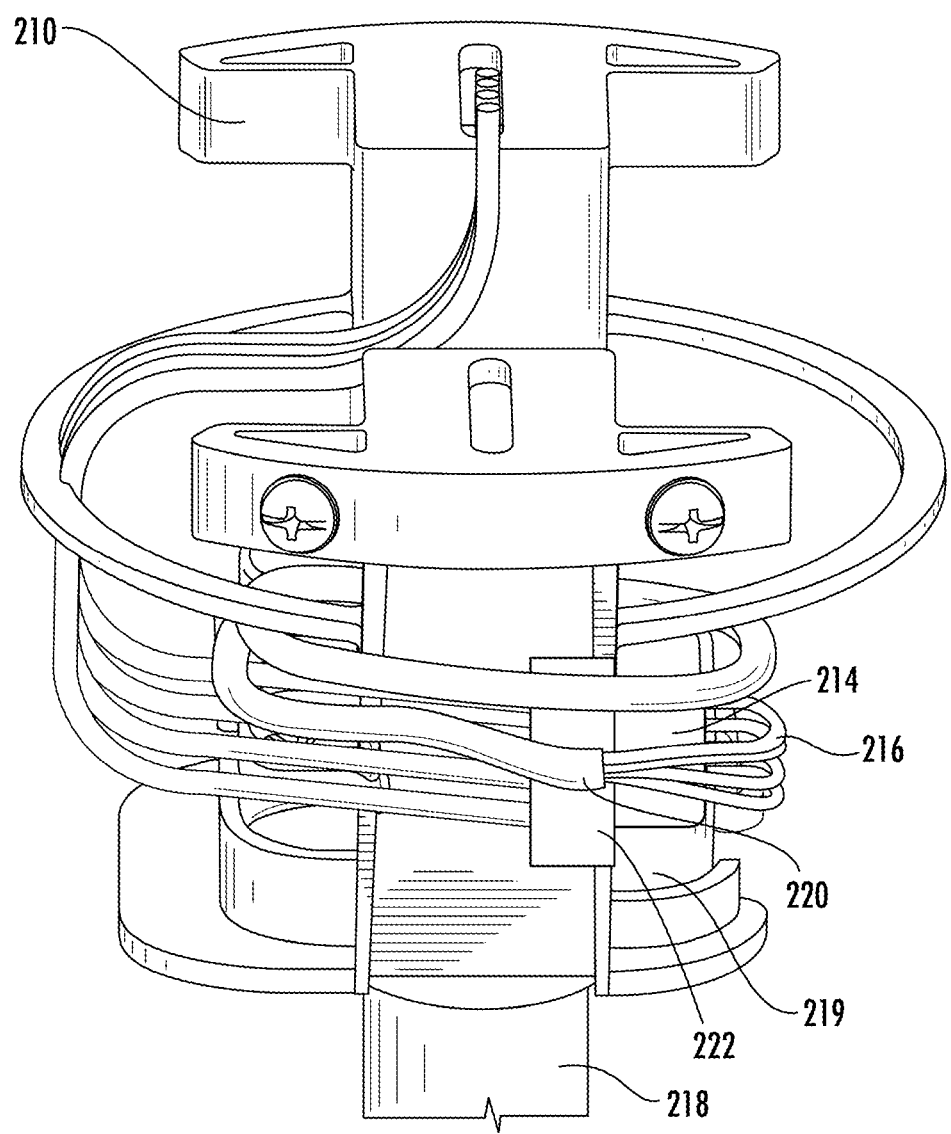
FIG. 23 shows a side perspective view of the hangable structure positioned so as to hang from the mounting bracket of a system for mounting ceiling fans according to one embodiment of the present invention.
Figure 24:
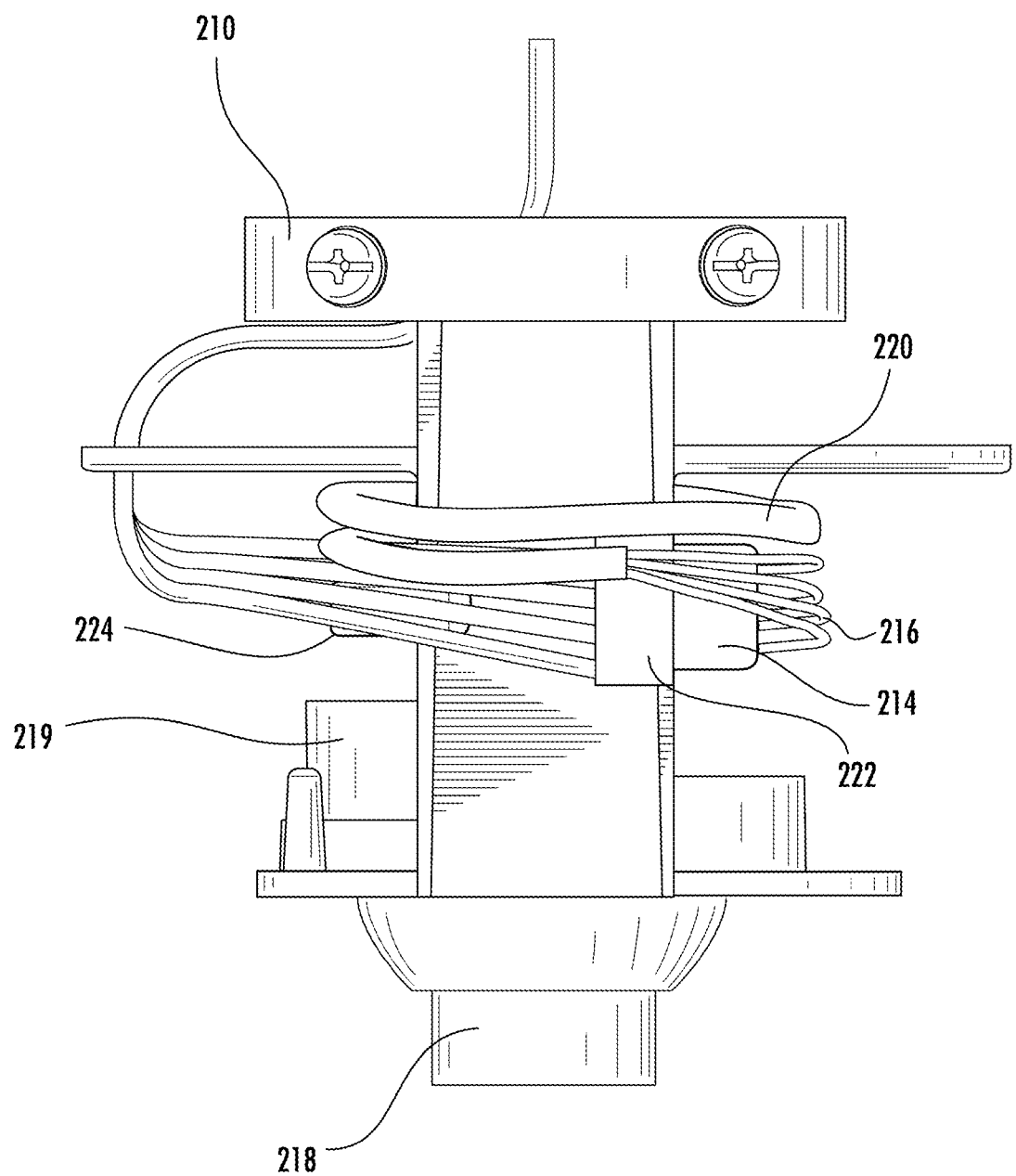
FIG. 24 shows a side view of the hangable structure positioned so as to hang from the mounting bracket of a system for mounting ceiling fans according to one embodiment of the present invention.

Turning now to hangable structures, FIGS. 6-7 illustrate one embodiment of a hangable structure 12 that can be used in some embodiments of the present invention. In this embodiment, the hangable structure 12 comprises a mating member 13, a ball or ball-like structure 68 positioned in the mating member and extending partially out the bottom of the mating member 13, and a down-rod 20. In the embodiment shown, the ball-like structure 68 has a substantially hollow interior to receive the down-rod 20. The down-rod 20 is coupled to the ball-like structure 68 with a down-rod pin 70 as best shown in FIGS. 18 and 19. The down-rod pin 70 passes through two aligned holes in the down-rod 20 and its ends sit in corresponding slots in the ball-like structure 68. The down-rod 20 can be coupled to the ball-like structure 68 using other techniques known to those of skill in the art. In some embodiments, the ball-like structure 68 and down-rod 20 can be constructed as a single component. The coupling of the down-rod 20 with the ball-like structure 68 permits the down-rod 20 to move or rotate as the ball-like structure 68 moves or rotates within the mating member 13. Such rotation of the ball-like structure 68 can, for example, facilitate mounting of a ceiling fan, lighting fixture, or other electrically-powered device on a ceiling or other supporting structure that is not horizontal. In such embodiments, the ball-like structure 68 can rotate in the mating member 13 allowing the down-rod 20 (which is coupled to the ball-like structure 68 in the embodiment shown) to likewise rotate and hang substantially vertically when the mounting bracket 10 is installed on a non-horizontal ceiling or supporting structure. In the embodiment shown (see, e.g., FIGS. 6, 18, and 19), a plate 72 with an opening to receive an upper portion of the ball-like structure 68 is coupled to the mating member 13 using a plurality of screws 74. The ball-like structure 68 can be secured to the mating member 13 using a variety of other techniques known to those of skill in the art. While the mating member 13, ball-like structure 68, and down-rod 20 are shown as separate components in the embodiment of FIGS. 1-19, it should be understood that the features of a ball or ball-like structure and/or down-rod can be integrated into a mating member such that the mating member is a single component. For example, a mating member can be fabricated as a single component to include an upper portion similar to that shown with a tubular structure extending downward (e.g., eliminating the ball or ball-like structure).

As discussed above, one or more sidewalls of a mating member can be provided with a protrusion that can slide into one or more corresponding slots in a mounting bracket to facilitate placement and retention of the mating member in the mounting bracket. In the embodiment shown in FIGS. 1-19, opposite sides of the mating member 13 include a protrusion 76 that can be received in corresponding slots on the inner sidewalls 50*a* of the mounting bracket. Alternative arrangements can also be used. For example, in another embodiment, a mounting bracket can be provided with a prong or similar protrusion, and a hangable structure can be provided with a corresponding groove. The groove can be adapted to slide over the prong, for example, when the hangable structure is positioned in the mounting bracket to facilitate alignment of the hangable structure with the mounting bracket.

In the embodiment shown in FIGS. 1-19, the mating member 13 also comprises an extension 78. The extension 78 projects from a sidewall of the mounting member. When the mating member 13 is positioned in the receiving portion 9 of the mounting bracket 10, the extension 78 can extend above one of the peripheral walls 62 on the mounting bracket 10. In other embodiments, the extension 78 can be positioned against a support surface of the peripheral wall 62.

In some embodiments, a second electrical connector is coupled to the hangable structure. For example, in such embodiments, the second electrical connector can be coupled to a mating member of the hangable structure. In the embodiment shown, the second electrical connector 16 is coupled to the extension 78 on the mating member 13. Two screws 80 are used to connect the second electrical connector 16 to the extension 78 in the embodiment shown in FIGS. 6-7. Various other techniques known to those of skill in the art can be used to couple an electrical connector to a hangable structure or mating member including, for example, use of an adhesive as well as fasteners other than screws.

A plurality of wires 82 are electrically coupled to the second electrical connector 16. The wires 82 can be used to electrically couple the second electrical connector 16 to components of an electrically-powered device that require electricity. For example, the wires can be connected to a fan motor and/or a light. In the embodiment shown in FIGS. 1-19, the plurality of wires 82 extend from the second connector 16 through the down-rod 20 to the fan motor.

In the embodiment shown, the wires 82 are coupled to the second electrical connector 16 by a plurality of spring-loaded tabs 84. Each spring-loaded tab 84 can be associated with a connection point on the second electrical connector 16. A plurality of openings can be provided in the second electrical connector 16 to receive the wires 82. When a spring-loaded tab 84 is depressed, the area of the opening can increase in order to receive a wire. When the spring-loaded tab 84 is released, the area of the opening decreases in order to retain the wire 82 in the opening. Other techniques known to those of skill in the art can be used to electrically couple wires to a second electrical connector including, for example, by hard wiring the wires to the second electrical connector.

A contact point can be provided in the opening of the second electrical connector 16 so as to electrically couple the second electrical connector 16 with one or more items to be powered (e.g., fan motor, lighting fixture, etc.). As discussed above, the first electrical connector 14 can be electrically coupled to a source of alternating-current electric power, such that the first electrical connector 14 can provide electricity to the items when the second electrical connector 16 is electrically coupled to the first electrical connector 14. In the embodiment shown, the second electrical connector 16 is a male connector and can be engaged or connected with a corresponding female electrical connector. In other embodiments, the second electrical connector 16 can be a female connector and can be engaged or connected with a corresponding male electrical connector.

In the embodiment shown in FIGS. 1-19, four wires 82 are provided. By way of example, two wires (black and white) can provide electricity to the fan motor, one wire (blue) can provide electricity to a light, and one wire can be a ground (green). While four wires 82 are shown in the embodiment of FIGS. 1-19, other wire arrangements can be provided. For example, in some embodiments, only two or three wires may be utilized.

The first electrical connector and the second electrical connector can be configured to engage vertically in some embodiments of the present invention. For example, in some embodiments, the second electrical connector (e.g., the electrical connector on a hangable structure) can be configured to vertically engage the first electrical connector (e.g., the electrical connector on a mounting bracket) when the hangable structure (e.g., a mating member of a hangable structure) is properly aligned in the receiving portion of the mounting bracket. The second electrical connector, in some embodiments, can be configured to engage the first electrical connector when the hangable structure is moved downwardly into position so as to rest in a proper alignment against the receiving portion of the mounting bracket. In some embodiments, with the second electrical connector vertically engaging the first electrical connector, the effect of gravity on the hangable structure can assist in keeping the first and second electrical connectors in electrical contact.

Thus, the interaction between a mating member of a hangable structure and a receiving portion of a mounting bracket can be an important aspect of some embodiments of the present invention. The mating member, in some embodiments, can be configured to be positioned against the receiving portion of the mounting bracket. The mating member and the receiving portion can incorporate features to ensure a proper or desired alignment of the hangable structure within the mounting bracket. Proper alignment of the mating member with the receiving portion can provide advantages to some embodiments of the present invention. For example, as noted above, proper alignment of the mating member with the receiving portion can facilitate vertical engagement of a second electrical connector on the hangable structure with a first electrical connector. As another example, proper alignment of the mating member in the mounting bracket can utilize the effect of gravity on the hangable structure to keep the hangable structure engaged to the mounting bracket. One way in which proper alignment can be facilitated and maintained is by utilizing a mating member that has a shape that substantially matches the shape of a surface (or surfaces) of the receiving portion.

With regard to the embodiment shown in FIGS. 1-19, FIGS. 8-10 show the mating member 13 prior to positioning in the receiving portion 9 of the mounting bracket. These Figures illustrate, for example, an embodiment where the shape of the mating member 13 substantially matches the shape of a surface (or surfaces) of the receiving portion 9 (e.g., peripheral walls 58,60,62). Likewise, as shown, the mating member 13 is wider than a lower portion of the hangable structure (e.g., the bottom of the ball-like structure 68 and the down-rod 20), and the opening 54 of the receiving portion 9 is of sufficient size to allow the lower portion to pass through the opening 54 and into the receiving portion 9 while the mating member 13 passes above the opening 54. After the lower portion of the hangable structure 12 is brought into the receiving portion 9 of the mounting bracket 10, the hangable structure can be lowered so that the mating member 13 is positioned against one or more support surfaces (e.g., peripheral walls 58,60,62 and the slots formed near the bottom of sidewalls 50a) in the receiving portion 9. The hollow center 56 of the receiving portion 9 is sized to interfere with gravity-influenced passage of the mating member entirely through the hollow center 56.

These structures, in this embodiment, facilitate proper alignment of the mating member 13 in the mounting bracket 10. FIGS. 12-15 and 17-19 show the mating member 13 properly aligned in the receiving portion 9 of the mounting bracket 10. As shown, the second electrical connector 16 is vertically engaged with the first electrical connector 14. The alignment of the mating member 13 in the receiving portion 9 of the mounting bracket 10 facilitated the vertical engagement of the connectors 14,16 (e.g., caused the corresponding male and female portions to align). In addition, the vertical engagement of the electrical connectors 14,16 advantageously occurs as the mating member 13 was positioned against the receiving portion 9 in proper alignment. As the hangable structure 12 is coupled with a ceiling fan motor and other associated components, the effect of gravity tends to keep the first and second electrical connectors 14,16 in electrical contact. The effect of gravity also tends to keep the mating member 13 in proper alignment within the receiving portion 9.

FIGS. 1-19 illustrate an exemplary embodiment of systems and methods of the present invention. This embodiment can be modified in a variety ways, for example, as previously described above. FIGS. 20-24 illustrate various components of another embodiment of a system 205 for mounting an electrically-powered device (in this embodiment, a ceiling fan) to a ceiling or other supporting structure. The system 205 includes a mounting bracket 210 and a hangable structure 212 configured such that the hangable structure 212 can be positioned in the mounting bracket 210. With the exception of the electrical connectors and hooks (discussed below), the structure associated with the mounting bracket 210 and the hangable structure 212 is the same for this system 205 as it was for the system 5 of FIGS. 1-19. Accordingly, except as discussed below, the interaction and operation of the mounting bracket 210, the hangable structure 212, and other components of FIGS. 20-24 should be understood to incorporate the same features (and potential variations of such features) and operate in the same manner as the mounting bracket 10, hangable structure 12, and other components discussed above in connection with FIGS. 1-19.

The primary difference in the embodiment of FIGS. 20-24 relates to the second electrical connector 214. As with the embodiment in FIGS. 1-19, a plurality of wires 216 extend from a fan motor (and/or light fixture) and through a down-rod 218 (or just through a mating member 219 if a down-rod is not utilized). To assist with wire management, a large length of the wires 216 may be encased in a sleeve 220 as known to those of skill in the art. Rather than being electrically coupled with an electrical connector that is attached to the mating member 219 or other part of the hangable structure 212, the plurality of wires 216 are electrically coupled with the second electrical connector 214, which in this embodiment, is not coupled to any other structure. The mounting bracket 210 still has a first electrical connector 222 coupled to it, though the first electrical connector can be positioned at other locations on the mounting bracket 210 in this embodiment due to the loose second electrical connector 214 (i.e., the second electrical connector 214 is not engaged in the first electrical connector 222 when the mating member 219 is properly aligned in the mounting bracket 210). This embodiment can result in the wires 216 being longer than necessary. The mounting bracket 210 can be configured so as to permit the plurality of wires 216 (whether encased in a sleeve or not) to be wrapped around at least a portion of the mounting bracket 210 prior to engaging the second electrical connector 214 in the first electrical connector 222. In the embodiment shown in FIGS. 20-24, one or more hooks 224 are provided to facilitate wrapping and retention of the plurality of wires 216 around the mounting bracket 210. Other structures could also be used.

This embodiment advantageously allow a given length of wires 216 to be used in a variety of ceiling fan configurations (e.g., at a variety of vertical distances from the ceiling or other supporting structure). For example, individuals utilize ceiling fans that hang at different vertical distances from a ceiling or other supporting structure. To account for this, a ceiling fan assembly kit may be provided with down-rods of different lengths, or the kit may permit installation without a down-rod. However, in order to do so, the wires provided with the kit must be long enough to electrically couple the fan motor to a source of alternating-current electric power at the greatest vertical distance. In the case of some embodiments of the present invention, the wires provided in such a kit would need to be long enough to permit the wires to electrically couple the fan motor to a second electrical connector which can then be engaged with a first electrical connector. However, if an individual wanted to install the ceiling fan at the shortest possible vertical distance between the ceiling and the fan motor, the individual may normally need to cut and/or strip the wires. In the embodiment shown in FIGS. 20-24, rather than cutting and/or stripping the wires 216, the individual can wrap the excess length of the wires 216 (and/or sleeve 220 enclosing the wires 216) around the hooks 224 on the mounting bracket 210 prior to engaging the second electrical connector 214 in the first electrical connector 222.

FIGS. 25-29 illustrate various components of another embodiment of a system 305 for mounting an electrically-powered device, such as a ceiling fan to a ceiling or other supporting structure. FIGS. 25-29 focus primarily on other embodiments of a mounting bracket 310, a hangable structure 312, and electrical connectors 318,320. It should be understood that the hangable structure 312 in FIGS. 25-29 could be coupled to various electrically-powered devices including, for example, the ceiling fan components shown in FIGS. 1, 11, and 16, lighting fixtures, etc. While various components are illustrated and described in connection with these Figures, it should be understood that not all systems according to the present invention may utilize each of the components and features illustrated and described.

Figure 25:
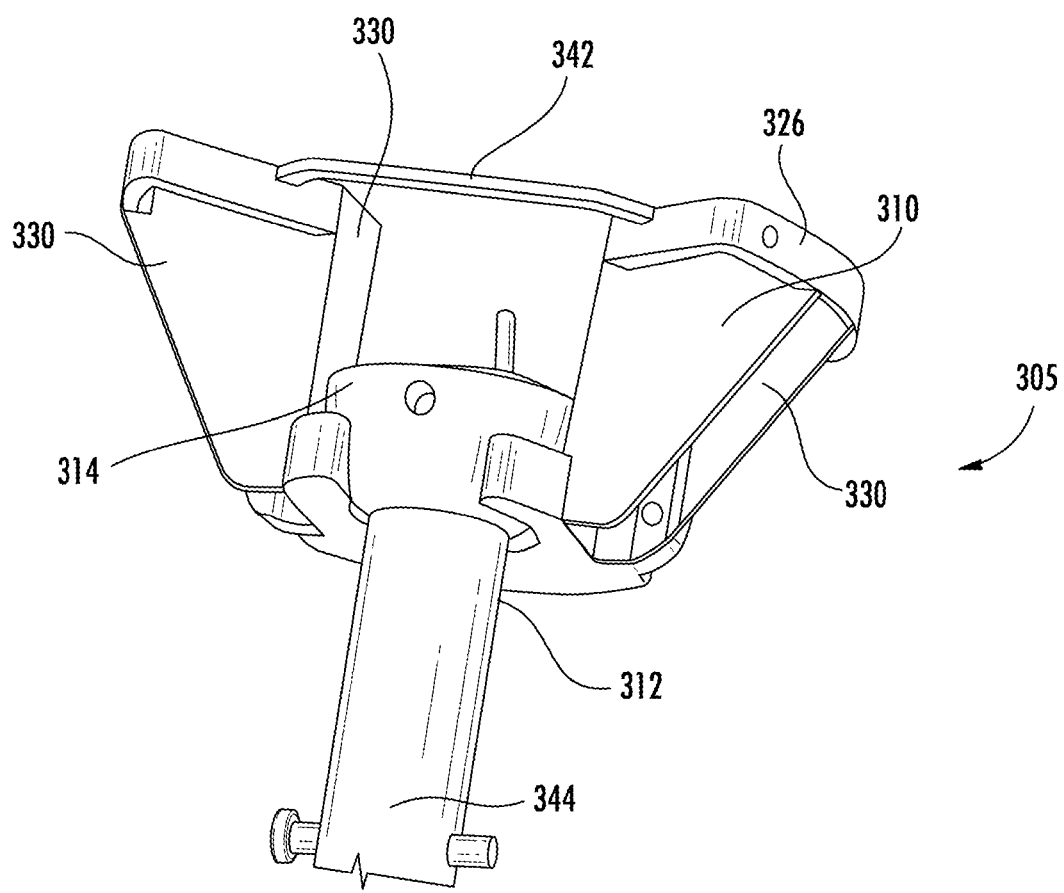
FIG. 25 shows a front perspective view of an embodiment of a mounting bracket and hangable structure for use in some embodiments of the present invention.

FIG. 25 is a front perspective view showing the hangable structure 312 positioned so as to be hanging from the mounting bracket 310. To facilitate this positioning, the mounting bracket 310 comprises a receiving portion 316 (shown in FIG. 26) and the hangable structure 312 comprises a mating member 314, with the mating member 314 being configured to be positioned against the receiving portion 316. The mounting bracket 310 includes a first electrical connector 318 (shown in FIG. 26), and the hangable structure 312 comprises a second electrical connector 320 (shown in FIG. 27). The first and second electrical connectors 318,320 are oriented such that they vertically engage (making an electrical connection) when the mating member 314 is properly positioned against the receiving portion 316 of the mounting bracket 310 as discussed further herein.

Figure 26:
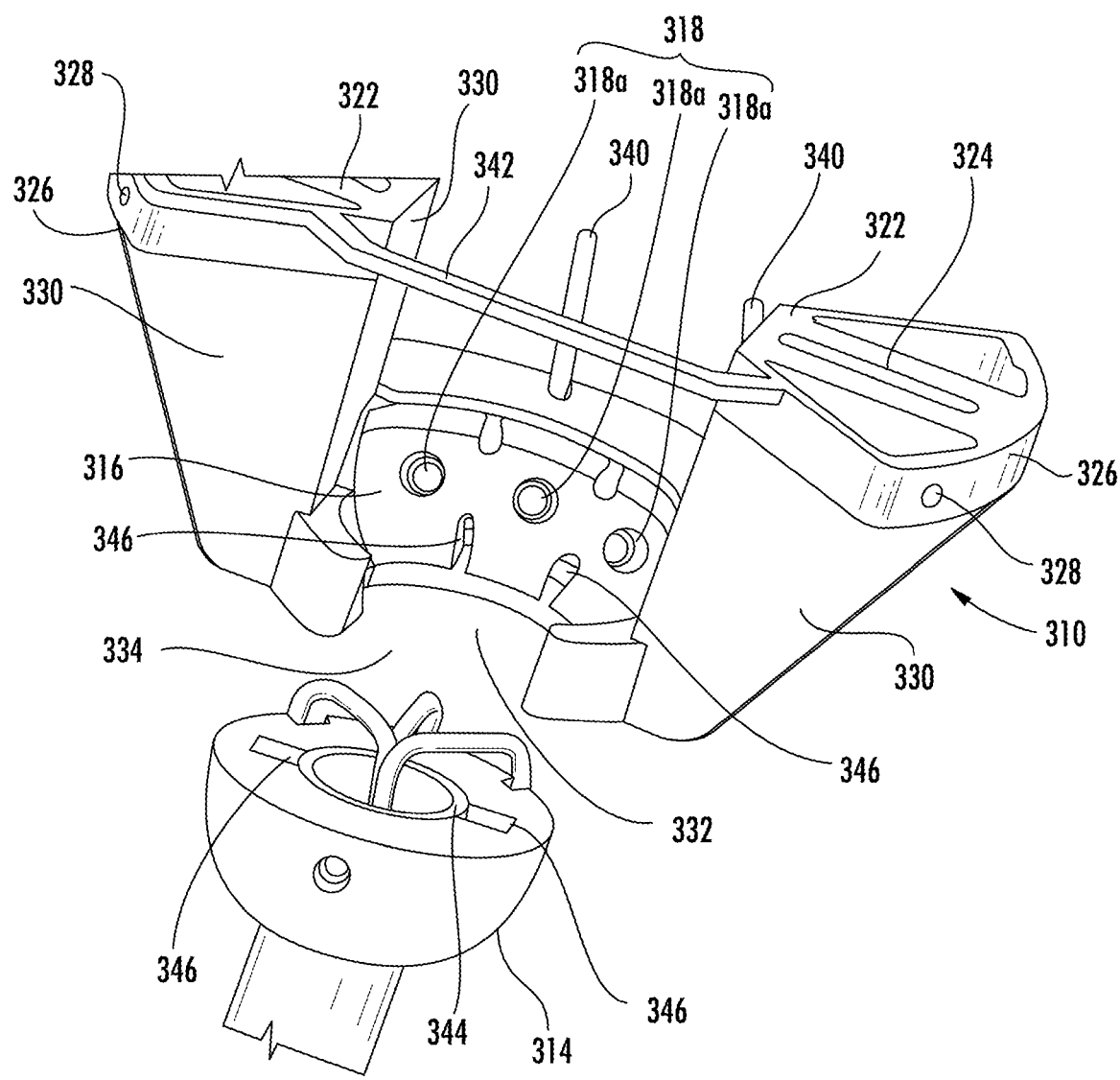
FIG. 26 shows another front perspective view of an embodiment of a mounting bracket and hangable structure for use in some embodiments of the present invention.

FIG. 26 illustrates one embodiment of a mounting bracket 310 that can be used in various embodiments of the present invention. The top portion of the mounting bracket 310 comprises two upper surfaces 322 that are adjacent to the ceiling and/or electrical junction box when the mounting bracket 310 is installed. Rather than having two upper surfaces as shown, alternative embodiments of mounting brackets can include a single upper surface (e.g., a ring-shaped upper surface, a square-shaped upper surface, an arc-shaped upper surface, etc.) or more than two upper surfaces. The number of upper surfaces can depend on a number of factors including, for example, the desired number of connection points for the mounting bracket 310, material costs, the weight of the fan, light or other electrically-powered device to be supported, and other features of the mounting bracket 310. In the embodiment shown, each of the upper surfaces 322 is provided with an opening 324. The openings 324 are adapted to receive a screw or other fastener to secure the mounting bracket 310 to a ceiling and/or an electrical junction box. For example, an electrical junction box may be provided with threaded openings to receive screws that pass through the openings 324 to secure the mounting bracket 310 to the electrical junction box. In the embodiment shown in FIGS. 25-29, the openings 324 are in the form of slots, though those of skill in the art will recognize that other shaped openings (e.g., circular) could also be used. Likewise, other techniques for coupling the mounting bracket 310 to the ceiling, support structure, and/or electrical junction box can be used in other embodiments.

In the embodiment shown, there are two upper side surfaces 326 that are proximate the upper surfaces 324 of the mounting bracket 310. As noted above, the number of upper surfaces in a mounting bracket may vary, and the number of upper side surfaces may likewise vary. In the embodiment shown, the upper side surfaces 326 are curved and include a plurality of openings 328. The curved upper side surfaces 326 and plurality of openings 328 can facilitate connection of a canopy to the mounting bracket 310 after the hangable structure 312 is positioned in the mounting bracket 310 and the electrical connectors 318,320 are engaged. In such an embodiment, the curved upper side surfaces 326 can be designed to coincide with an inner side surface of a canopy, and the canopy can include a plurality of openings that align with the plurality of openings 328 in the upper side surfaces 326. The canopy can be secured to the mounting bracket 310, in such embodiments, using a plurality of fasteners (e.g., screws) that pass through the openings in the canopy and the openings 328 in the upper side surfaces 326. Other techniques known to those of skill in the art can also be used to secure a canopy to a mounting bracket depending on the size and shape of the canopy, the number of desired connection points between the canopy and the mounting bracket, the desired fastening method, and others.

The mounting bracket shown 310 in the embodiment of FIGS. 25-29 also comprises a receiving portion 316 as noted above. The receiving portion 316 of the mounting bracket 310 can be designed to facilitate placement of, and to provide support to, the mating member 314 of the hangable structure 312. The receiving portion 316 can have a number of different configurations depending on factors such as the materials of construction, the weight of the fan, light, or other electrical device to be supported, the size and shape of the mating member 314, the size and shape of any down-rod or other portions of the hangable structure 312, the location of the electrical connectors 318,320, the ceiling or supporting structure to which the mounting bracket 310 is to be mounted, and others.

Multiple sidewalls 330 extend from the upper surfaces 322 to a lower portion of the mounting bracket 310. While multiple sidewalls 330 are shown in the Figures, in other embodiments, fewer or more sidewalls can extend from an upper surface to a lower surface. The number of sidewalls can depend on a number of factors including the materials used to construct the mounting bracket, the thickness of the sidewall(s), the number of upper surface(s), the position, shape, and configuration of the lower surface, any features on the lower surface, the weight of the fan, light, or other device being supported, and others.

In the embodiment shown in FIGS. 25-29, the receiving portion 316 of the mounting bracket 310 is configured to assist in placement and support of the mating member 314 which is a ball-like structure in this embodiment (while a lower hemisphere is shown in FIGS. 25-29, an upper hemisphere or cover could be coupled to the lower hemisphere in some embodiments). In this embodiment, the receiving portion 316 comprises a curved plane shaped to complement the hemispherically shaped outer surface of the mating member 314.

While the receiving portion 316 forms an opening or hollow center 332 (e.g., to permit the down-rod 344 or other structure to extend downward from the mounting bracket 310), the receiving portion may also comprise an opening 334 (in this embodiment, formed by the ends of the curved plane in the receiving portion 316), in some embodiments, to assist with receiving the hangable structure 312. In other words, instead of forming a complete perimeter around the hollow center 332, the curved plane of the receiving portion 316 has an opening 334 to permit a portion of the hangable structure 312 (e.g., a down-rod 344 or other lower portion of the hangable structure 312) to slide into the hollow center 332. The opening 334, in this embodiment, is sized to help retain the mating member 314 in proper alignment once positioned on the mounting bracket 310.

The opening 334 of the receiving portion 316 may be sufficiently sized to allow a lower portion of the hangable structure 312 (e.g., a down-rod 344 or other structure) to pass through the opening 334 and into the receiving portion 316 while the mating member 314 passes above the opening 334. In some embodiments, the opening 334 of the receiving portion 316 may be sized to be smaller than the diameter of the mating member 314 (or other relevant dimension if another shape is used) so as to help retain the mating member 314 in the receiving portion 316.

Likewise, the hollow center 332 can be dimensioned and/or shaped so as to permit a lower portion of the hangable structure 312 (e.g., a down-rod 344 or other structure) to pass downwardly through it as a result of gravity but to prevent the mating member 314 from doing so. In other words, the mating member 314 may be shaped differently from, and/or sized larger than, the hollow center 332 so as to interfere with gravity influenced-passage of the mating member 314 entirely through the hollow center 332 of the receiving portion 316.

In this embodiment, the curved plane of the receiving portion 316 is a support surface, such that a portion of the outer surface of the mating member 314 rests or is positioned against the support surface (curved plane). In this manner, the curved plane of the receiving portion 316 assists in keeping the mating member 314 in proper alignment. In some embodiments, the support surface can comprise multiple surfaces. For example, a plurality of curved planes could form the support surface in some embodiments. The curved plane of the receiving portion 316 also forms the hollow center 332 in this embodiment, though in other embodiments, structure in addition to one or more curved plane(s) can help form a hollow center.

The mounting bracket 310 comprises a first electrical connector 318. In this embodiment, the first electrical connector 318 comprises a plurality of contact points incorporated into the curved plane of the receiving portion 316. While three contact points are shown in this embodiment, other numbers of contact points can be provided depending on the number of wire connections to be made. In the embodiment shown, the contact points are in the form of spring pin electrical contacts 318*a*. In some embodiments utilizing spring pin electrical contacts in a receiving portion of a mounting bracket, the spring pin electrical contacts can be configured to be actuated (i.e., an electrical connection made) when the spring pins are depressed (e.g., when a mating member is properly aligned in the receiving portion). The spring pin electrical contacts 318*a* can be incorporated into the curved plane of the receiving portion 316 using techniques known to those of skill in the art. For example, in the embodiment shown in FIG. 27, the portion of the mounting bracket 310 incorporating the spring pin electrical contacts 318*a* can be provided as a separate assembly 336 and then coupled to the mounting bracket 310 via a plurality of fasteners 338. The curved plane of the receiving portion 316, for example, can be provided with a plurality of holes to receive the spring pin electrical contacts 318*a* when the assembly 336 is coupled to the mounting bracket 310.

A plurality of wires 340 are configured to be electrically coupled to the spring pin electrical contacts 318*a* when the spring pins are depressed. The wires 340 can be used to electrically couple the first electrical connector 318 to a source of alternating-current electric power (e.g., house power, power from a generator and other sources known to those of skill in the art). Wire nuts or other techniques known to those of skill in the art can be used to electrically couple the wires 340 to corresponding wires that are connected to the source of alternating-current electric power.

In being electrically coupled to a source of alternating-current electric power, the first electrical connector 318 can provide electricity to devices that are connected to the second electrical connector 320 when the first and second electrical connectors 318,320 are electrically coupled. In the embodiment shown, the first electrical connector 318 utilizes electrical contact spring pins 318*a* and can be engaged or connected with corresponding electrical contact surfaces (e.g., electrical contact surfaces 320*a*). In other embodiments, the first electrical connector 318 can comprise a plurality of electrical contact surfaces and can be engaged or connected with a corresponding plurality of electrical contact spring pins.

Figure 27:
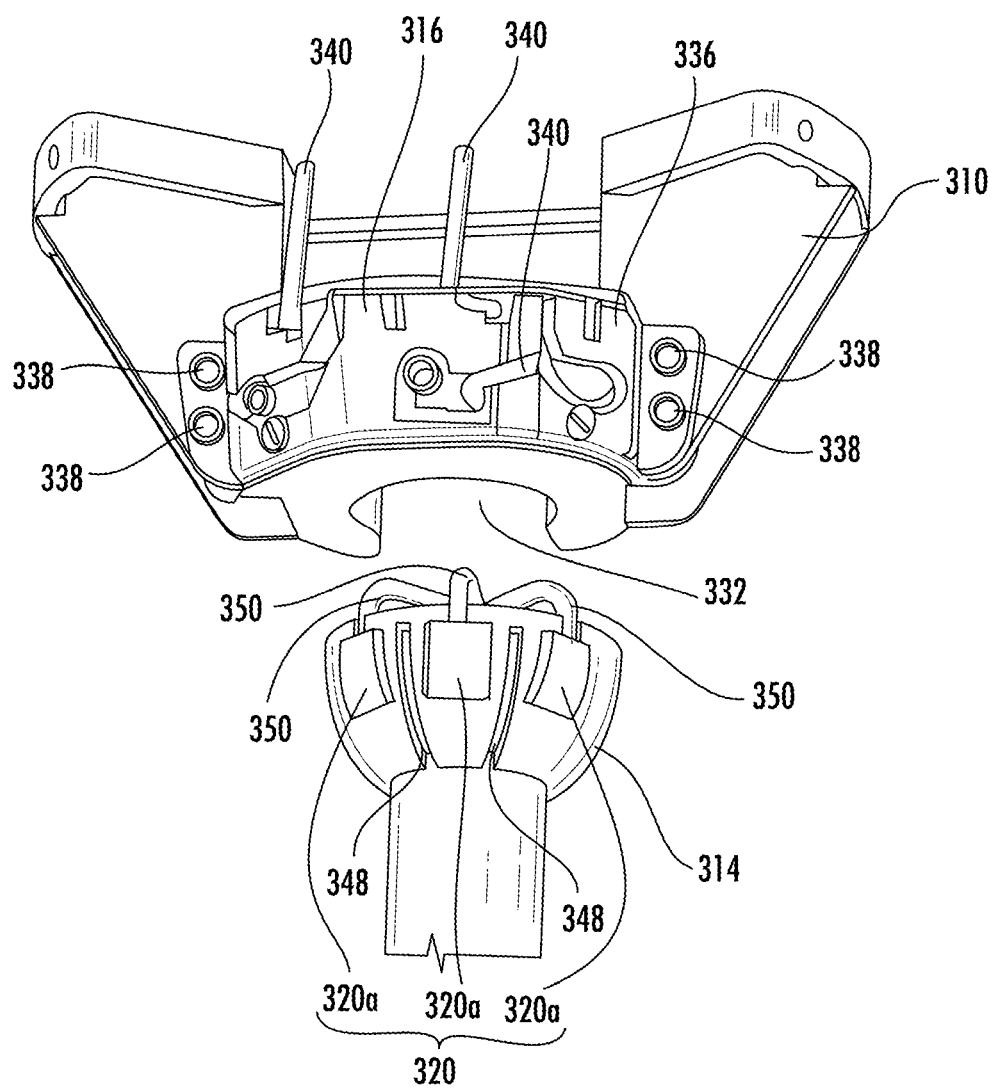
FIG. 27 shows a rear perspective view of an embodiment of a mounting bracket and hangable structure for use in some embodiments of the present invention.
Figure 28:
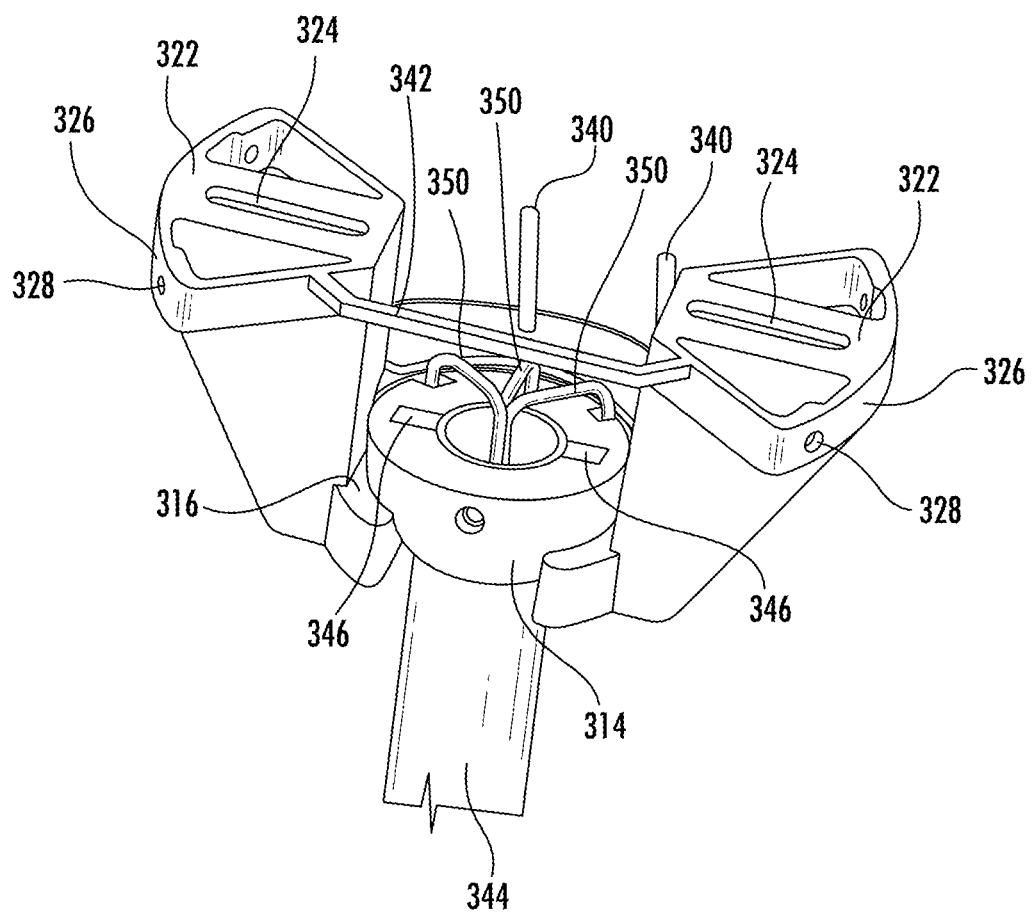
FIG. 28 shows another front perspective view of an embodiment of a mounting bracket and hangable structure for use in some embodiments of the present invention.
Figure 29:
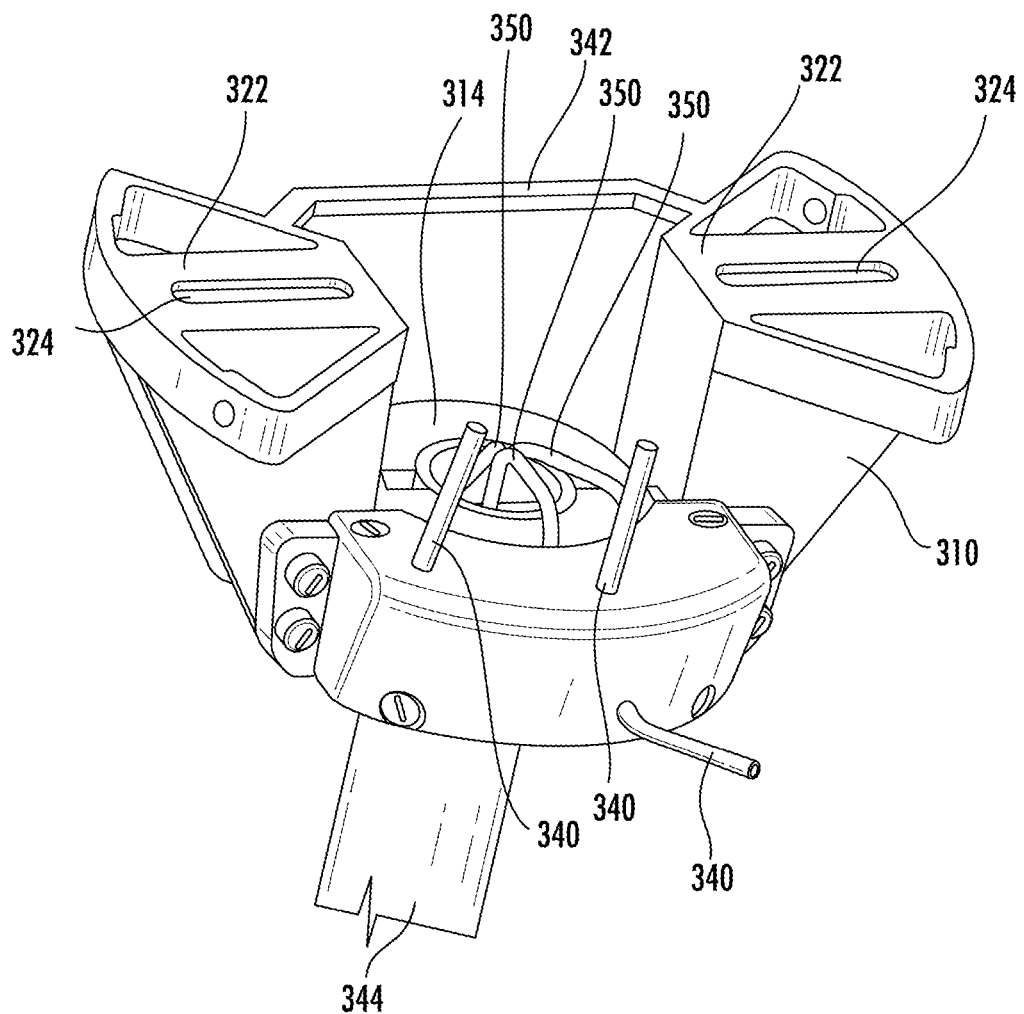
FIG. 29 shows another rear perspective view of an embodiment of a mounting bracket and hangable structure for use in some embodiments of the present invention.

In the embodiment shown in FIGS. 25-29, three wires 340 are provided (as best seen in FIGS. 27 and 29). By way of example, the two wires 340 extending through the top surface of the assembly 336 can be electrically coupled to the source of alternating-current electric power and can ultimately provide electricity to an electrically-powered device (e.g., a fan motor). The wire 340 extending out the rear surface of the assembly 336 can be used as the ground, for example. While three wires 340 are shown in the embodiment of FIGS. 25-29, other wire arrangements can be provided. For example, in some embodiments, two or four wires may be utilized.

As noted above, in some embodiments, mounting brackets can be provided with structure to facilitate use of a remote control to operate the ceiling fan, lighting fixture, or other electrically-powered device. For example, the mounting bracket 310 shown in the embodiment of FIGS. 25-29 is provided with a rail 342 that spans between the upper surfaces 322. The rail 342 and portions of the upper surfaces 322 can provide structural support for a remote control receiver, in some embodiments. As known to those of skill in the art, a remote control receiver can receive wireless signals from a remote control to operate the electrically-powered device (e.g., turn a ceiling fan on/off, adjust fan speed, turn light on/off, adjust brightness, etc.). The remote control receiver can be electrically incorporated into various systems of the present invention using techniques known to those of skill in the art. While a rail spanning the upper surfaces is shown as an exemplary embodiment, structure having other shapes and sizes can also be used (e.g., a ring structure such as that shown in FIGS. 1-19). One factor in selecting the size and shape of the structure as well as its location on the mounting bracket is providing sufficient space for a hangable structure to be properly positioned in the receiving portion of the mounting bracket.

Turning now to the hangable structure 312, FIGS. 25-29 provide various views of the hangable structure 312 of this embodiment. In this embodiment, the hangable structure 312 comprises a mating member 314 that is a ball-like structure (approximately the lower half of a sphere), and a down-rod 344. The ball-like structure of the mating member 314 can allow for some rotation of the mating member 314 when it is aligned in the receiving portion 316 of the mounting bracket 310. Such rotation of the mating member 314 can, for example, facilitate mounting of a ceiling fan, lighting fixture, or other electrically-powered device on a ceiling or other supporting structure that is not horizontal. In such embodiments, the rotation of the mating member 314 can also cause the down-rod 344 to likewise rotate and hang substantially vertically when the mounting bracket 310 is installed on a non-horizontal ceiling or supporting structure.

In the embodiment shown, the mating member 314 has a substantially hollow interior to receive the down-rod 344. The down-rod 344 is coupled to the mating member 314 with a down-rod pin (not visible in FIGS. 25-29). The down-rod pin passes through two aligned holes in the down-rod 344 and its ends sit in corresponding slots 345 in the mating member 314. The down-rod 344 can be coupled to the mating member 314 using other techniques known to those of skill in the art. In some embodiments, the mating member 314 and down-rod 344 can be constructed as a single component.

As discussed above, one or more walls of a mating member can be provided with a protrusion that can slide into one or more corresponding slots in a mounting bracket (or vice versa) to facilitate placement and retention of the mating member in the mounting bracket. In the embodiment shown in FIGS. 25-29, the curved plane of the receiving portion 316 is provided with two prongs 346. The mating member 314 is provided with two corresponding grooves 348. The grooves 348 are adapted to slide over the prongs 346 when the mating member 314 is positioned in the receiving portion 316 and facilitate/maintain alignment of the mating member 314 on the mounting bracket 310. Alternative arrangements can also be used.

In some embodiments, a second electrical connector is coupled to the hangable structure 312. In the embodiment shown, the mating member 314 comprises the second electrical connector 320. In this embodiment, the second electrical connector 320 comprises a plurality of electrical contact surfaces 320a. The contact surfaces 320a are electrically conductive such that electricity is conducted from the electrical contact spring pins 318a when the electrical contact surfaces 320a engage the corresponding electrical contact spring pins 318a (e.g., when the mating member 314 is properly aligned in the receiving portion 316 of the mounting bracket). The electrical contact surfaces 320a can be incorporated into the mating member 314 using techniques known to those of skill in the art.

A plurality of wires 350 are electrically coupled to the second electrical connector 320. The wires 350 can be used to electrically couple the second electrical connector 320 to components of an electrically-powered device that require electricity. For example, the wires can be connected to a fan motor and/or a light. In the embodiment shown in FIGS. 25-29, the plurality of wires 350 extend from the contact surfaces 320 and through the down-rod 344 to eventually reach an electrically-powered device. The wires 350 can be coupled to the electrical contact surfaces 320a using techniques known to those of skill in the art such as by soldering. By way of example, two of the wires 350 can provide electricity to an electrically-powered device (e.g., a fan motor), and the third wire 350 can be grounded in some embodiments. While three wires 350 are shown in the embodiment of FIGS. 25-29, other wire arrangements can be provided. For example, in some embodiments, two or four wires may be utilized.

As discussed above, the first electrical connector 318 can be electrically coupled to a source of alternating-current electric power, such that the first electrical connector 318 can provide electricity to the items when the second electrical connector 320 is electrically coupled to the first electrical connector 318. In the embodiment shown, the second electrical connector 320 comprises a plurality of electrical contact surfaces 320a and can be engaged or electrically connected with the corresponding electrical contact spring pins 318a of the first electrical connector 318. In other embodiments, the second electrical connector 320 can be a plurality of electrical contact spring pins and the first electrical connector 318 can be a corresponding plurality of contact surfaces.

The first electrical connector 318 and the second electrical connector 320 engage vertically in this embodiment of the present invention. In this embodiment, the electrical contact surfaces 320a of the second electrical connector 320 vertically engage the corresponding electrical contact spring pins 318a of the first electrical connector 318 (e.g., depress the electrical contact spring pins 318a) when the hangable structure 312 (e.g., the mating member 314) is properly aligned in the receiving portion 316 of the mounting bracket 310. Specifically, the second electrical connector 320 engages the first electrical connector 318 when the mating member 314 of the hangable structure 312 is moved downwardly into position so as to rest in a proper alignment against the receiving portion 316 of the mounting bracket 310. With the second electrical connector 320 vertically engaging the first electrical connector 318, the effect of gravity on the mating member 314 of the hangable structure 312 can assist in keeping the first and second electrical connectors 318,320 in electrical contact.

With regard to the embodiment shown in FIGS. 25-29, FIGS. 26-27 show the mating member 314 prior to positioning in the receiving portion 316 of the mounting bracket 310. These Figures illustrate, for example, an embodiment where the shape of the mating member 314 substantially matches the shape of a surface (or surfaces) of the receiving portion 316 (e.g., the curved plane). Likewise, as shown, the mating member 314 is wider than a lower portion of the hangable structure (e.g., the down-rod 344), and the opening 334 of the receiving portion 316 is of sufficient size to allow the lower portion (e.g., the down-rod 344) to pass through the opening 334 and into the receiving portion 316 while the mating member 314 passes above the opening 334. After the lower portion of the hangable structure 312 is brought into the receiving portion 316 of the mounting bracket 310, the hangable structure can be lowered so that the mating member 314 is positioned against one or more support surfaces (e.g., the curved plane) in the receiving portion 316. The hollow center 332 of the receiving portion 316 is sized to interfere with gravity-influenced passage of the mating member 314 entirely through the hollow center 332.

These structures, in this embodiment, facilitate proper alignment of the mating member 314 in the mounting bracket 310. FIGS. 25 and 28-29 show the mating member 314 properly aligned in the receiving portion 316 of the mounting bracket 310. While not visible in these Figures, the electrical contact surfaces 320a of the second electrical connector 320 have vertically engaged the first electrical connector 318 by depressing the corresponding electrical contact spring pins 318a. The alignment of the mating member 314 in the receiving portion 316 of the mounting bracket 310 facilitated the vertical engagement of the electrical connectors 318,320. In addition, the vertical engagement of the electrical connectors 318,320 advantageously occurred as the mating member 314 was positioned against the receiving portion 316 in proper alignment. As the hangable structure 312 is coupled with a ceiling fan motor and other associated components (or other electrically-powered devices), the effect of gravity tends to keep the first and second electrical connectors 318,320 in electrical contact. The effect of gravity also tends to keep the mating member 314 in proper alignment within the receiving portion 316.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A ceiling fan kit comprising:
   a ceiling fan;
   a first hangable structure configured for attachment to the ceiling fan, wherein the first hangable structure comprises a first mating structure configured for connection to the ceiling fan either indirectly via an elongate down-rod or directly without an elongate down-rod such that selection of a length of the elongate down-rod or omission of the elongate down-rod in favor of direct connection of the ceiling fan to the first mating structure, so as to allow a vertical distance between the first mating structure and the ceiling fan to be selectively determined by an installer of the ceiling fan, wherein the first mating structure is shaped to be engaged to support the ceiling fan regardless of whether the elongate down-rod is present or absent;
   an electrical cable comprising electrical cable wires and an electrical cable connector, wherein the electrical cable wires are operatively connected to the ceiling fan to supply electrical power to the ceiling fan, and wherein the electrical cable has a length selected to accommodate use of the first hangable structure with different lengths of the elongate down-rod to facilitate selection of the vertical distance during installation of the ceiling fan; and
   a mounting bracket assembly comprising a mounting bracket, a mounting bracket assembly electrical connector, and hooks on opposing sides of the mounting bracket around which an excess length of the electrical cable is configured to wind to retain the excess length of the electrical cable in a compact configuration after installation, wherein the mounting bracket is configured to be attached to a ceiling and comprises a receiving portion, wherein the receiving portion is configured to interface with the first mating structure to support the ceiling fan from the mounting bracket, and wherein the mounting bracket assembly is configured for retention of an excess length of the electrical cable by the mounting bracket when the vertical distance results an excess length of the electrical cable at the mounting bracket assembly.

2. The ceiling fan kit of claim 1, wherein the mounting bracket assembly is configured to enable the excess length of the electrical cable to wrap around at least a portion of the mounting bracket assembly and also enables installation of a plurality of vertical heights of ceiling fans without shortening the electrical cable.

3. The ceiling fan kit of claim 1, wherein the first mating structure and the receiving portion have complementarily-shaped interfacing portions.

4. The ceiling fan kit of claim 1, wherein the ceiling fan comprises a lighting fixture.

5. The ceiling fan kit of claim 1, wherein the receiving portion is configured to interfere with gravity-influenced passage of the first mating structure entirely through a hollow center of the receiving portion.

6. The ceiling fan kit of claim 1, wherein the electrical cable connector is positionable at a variety of positions relative to the first hangable structure.

7. A system for mounting an electrically-powered device to a supporting structure, comprising:
   a mounting bracket comprising a receiving portion and hooks, wherein the receiving portion comprises a receiving portion support surface having an opening, and wherein the hooks are disposed on opposing sides of the mounting bracket around which a length of a plurality of wires may be wound to retain an excess length of the plurality of wires in a compact configuration after installation;
   a first electrical connector coupled to the mounting bracket; and
   a hangable structure comprising a mating member configured to be positioned against the receiving portion, the hangable structure further comprising a second electrical connector positionable with respect to the hangable structure and the plurality of wires, wherein the plurality of wires extend from the second electrical connector to the electrically-powered device, the hangable structure further comprising a down-rod, wherein the mating member comprises a mating member support surface shaped to be engaged with the receiving portion support surface to support the electrically-powered device,
   wherein the mating member is further configured to enable the plurality of wires to wrap around a portion of the mounting bracket to accommodate an excess length of the plurality of wires.

8. The system of claim 7, wherein the mating member is further configured to be passed above the opening and lowered against the receiving portion support surface.

9. The system of claim 7, wherein the receiving portion support surface comprises a lower surface and at least one slot formed by the lower surface and two ridges on a sidewall of the mounting bracket.

10. The system of claim 9, wherein the mating member comprises a protrusion configured to slide into the at least one slot.

11. The system of claim 7, wherein the receiving portion further comprises at least one slot formed by two ridges on a sidewall of the mounting bracket.

12. The system of claim 11, wherein the mating member comprises a protrusion configured to slide into the at least one slot.

13. The system of claim 7, wherein the mating member support surface and the receiving portion support surface have substantially complementary matching shapes.

14. The system of claim 7, wherein the mating member is wider than a lower portion of the hangable structure, wherein the opening is of sufficient size to allow the lower portion to pass through the opening and into the receiving portion while the mating member passes above the opening, and wherein the receiving portion is configured so that, after the lower portion is brought into the receiving portion, the hangable structure can be lowered so that the mating member is positioned against the receiving portion so that the receiving portion interferes with gravity-influenced passage of the mating member entirely through the receiving portion.

15. A system for mounting an electrically-powered device to a ceiling or other supporting structure, comprising:

a mounting bracket comprising a receiving portion and a first electrical connector, wherein the receiving portion comprises a receiving portion support surface, and wherein the mounting bracket is configured to enable wires electrically coupled to the first electrical connector to wrap around at least a portion of the mounting bracket;

a hangable structure comprising a mating member configured to be positioned against the receiving portion, wherein the mating member comprises a mating member support surface that is shaped to be engaged with the receiving portion support surface to support the electrically-powered device; and a wired connection between the electrically-powered device and a second electrical connector, wherein the wired connection passes through the mating member, wherein:

the second electrical connector is configured to releasably couple with the first electrical connector to provide power to the electrically-powered device when coupled together; and the mounting bracket and the hangable structure are configured so that, when the mating member support surface is positioned against the receiving portion support surface, gravity acting on the hangable structure tends to keep the hangable structure engaged to the mounting bracket, wherein the mounting bracket is configured for retention of an excess length of the wired connection by having hooks on opposing sides of the mounting bracket around which the excess length of the wired connection is configured to wind to retain the excess length in a compact configuration after installation.

* * * * *